US011113576B2

(12) United States Patent
Saruta

(10) Patent No.: US 11,113,576 B2
(45) Date of Patent: Sep. 7, 2021

(54) INFORMATION PROCESSING APPARATUS FOR TRAINING NEURAL NETWORK FOR RECOGNITION TASK AND METHOD THEREOF

(71) Applicant: CANON KABUSHIKI KAISHA, Tokyo (JP)

(72) Inventor: Takayuki Saruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 227 days.

(21) Appl. No.: 16/389,546

(22) Filed: Apr. 19, 2019

(65) Prior Publication Data

US 2019/0332898 A1 Oct. 31, 2019

(30) Foreign Application Priority Data

Apr. 26, 2018 (JP) .............................. JP2018-085259

(51) Int. Cl.
*G06K 9/00* (2006.01)
*G06K 9/62* (2006.01)
(Continued)

(52) U.S. Cl.
CPC ......... *G06K 9/6262* (2013.01); *G06K 9/6256* (2013.01); *G06N 3/04* (2013.01); *G06N 3/08* (2013.01)

(58) Field of Classification Search
CPC .. G06K 9/6262; G06K 9/6256; G06K 9/6269; G06K 9/00664; G06K 9/6273;
(Continued)

(56) References Cited

U.S. PATENT DOCUMENTS 7,295,687 B2\* 11/2007 Kee ..................... G06K 9/00281
382/118
2005/0213810 A1\* 9/2005 Sabe .................... G06K 9/6282
382/159
(Continued)

FOREIGN PATENT DOCUMENTS

JP 2016-6626 A 1/2016
JP 2017-84320 A 5/2017

OTHER PUBLICATIONS

Zhicheng Yan, et al. "HD-CNN: Hierarchical Deep Convolutional Neural Networks for Large Scale Visual Recognition;" International Conference on Computer Vision 2015; pp. 2740-2748 (Year: 2015).\*
(Continued)

*Primary Examiner* — Van D Huynh
(74) *Attorney, Agent, or Firm* — Canon U.S.A., Inc. IP Division

(57) ABSTRACT

An apparatus includes a multitask setting unit configured to set a plurality of recognition tasks for which a multilayer neural network is trained, a neural network (NN) training unit configured to train the multilayer NN for the set plurality of recognition tasks, an NN evaluation unit configured to evaluate a training result of the multilayer NN, and a training parameter setting unit configured to set a training parameter in training the multilayer NN for the plurality of recognition tasks, based on a result of evaluation by the NN evaluation unit.

20 Claims, 18 Drawing Sheets

(51) Int. Cl.
*G06N 3/04* (2006.01)
*G06N 3/08* (2006.01)

(58) Field of Classification Search
CPC .......... G06N 3/04; G06N 3/08; G06N 3/0481; G06N 3/084; G06N 20/10; G06N 3/0454
USPC ....................................................... 382/157
See application file for complete search history.

(56) References Cited

U.S. PATENT DOCUMENTS

| 2011/0041100 | A1* | 2/2011 | Boillot | G06F 3/011 |
| | | | | 715/863 |
| 2015/0347831 | A1* | 12/2015 | Tamatsu | G06K 9/00805 |
| | | | | 382/156 |
| 2016/0260014 | A1* | 9/2016 | Hagawa | G06N 3/08 |
| 2017/0083796 | A1* | 3/2017 | Kim | G06K 9/00369 |
| 2019/0034800 | A1* | 1/2019 | Shiratani | G06N 3/0427 |
| 2019/0147339 | A1* | 5/2019 | Nachum | G06N 3/0472 |
| | | | | 706/25 |
| 2020/0089755 | A1* | 3/2020 | Shazeer | G06K 9/6227 |

OTHER PUBLICATIONS

Alex Krizhevsky, et al.; "ImageNet Classification with Deep Convolutional Neural Networks;" In Advances in Neural Information Processing Systems, pp. 1-9, 2012.

Jeff Donahue, et al.; "DeCAF: A Deep Convolutional Activation Feature for Generic Visual Recognition," arXiv:1310.1531v1 [cs.Cv] Oct. 6, 2013; pp. 1-10.

Shuo Yang et al.; "From Facial Parts Responses to Face Detection: A Deep Learning Approach," International Conference on Computer Vision 2015; pp. 3676-3684.

Zhicheng Yan, et al. "HD-CNN: Hierarchical Deep Convolutional Neural Networks for Large Scale Visual Recognition;" International Conference on Computer Vision 2015; pp. 2740-2748.

Ross Girshick; "Fast R-CNN;" International Conference on Computer Vision 2015; arXiv:1504.08083v2 [cs.CV] Sep. 27, 2015; pp. 1-9.

J.R.R. Uijlings, et al; "Selective Search for Object Recognition;" International Journal of Computer Vision 104.2; pp. 1-14, 2013.

Shai Shalev-Shwartz et al.; "Pegasos: Primal Estimated sub-GrAdient SOlver for SVM;" International Conference on Machine Learning 2007; pp. 1-27.

* cited by examiner

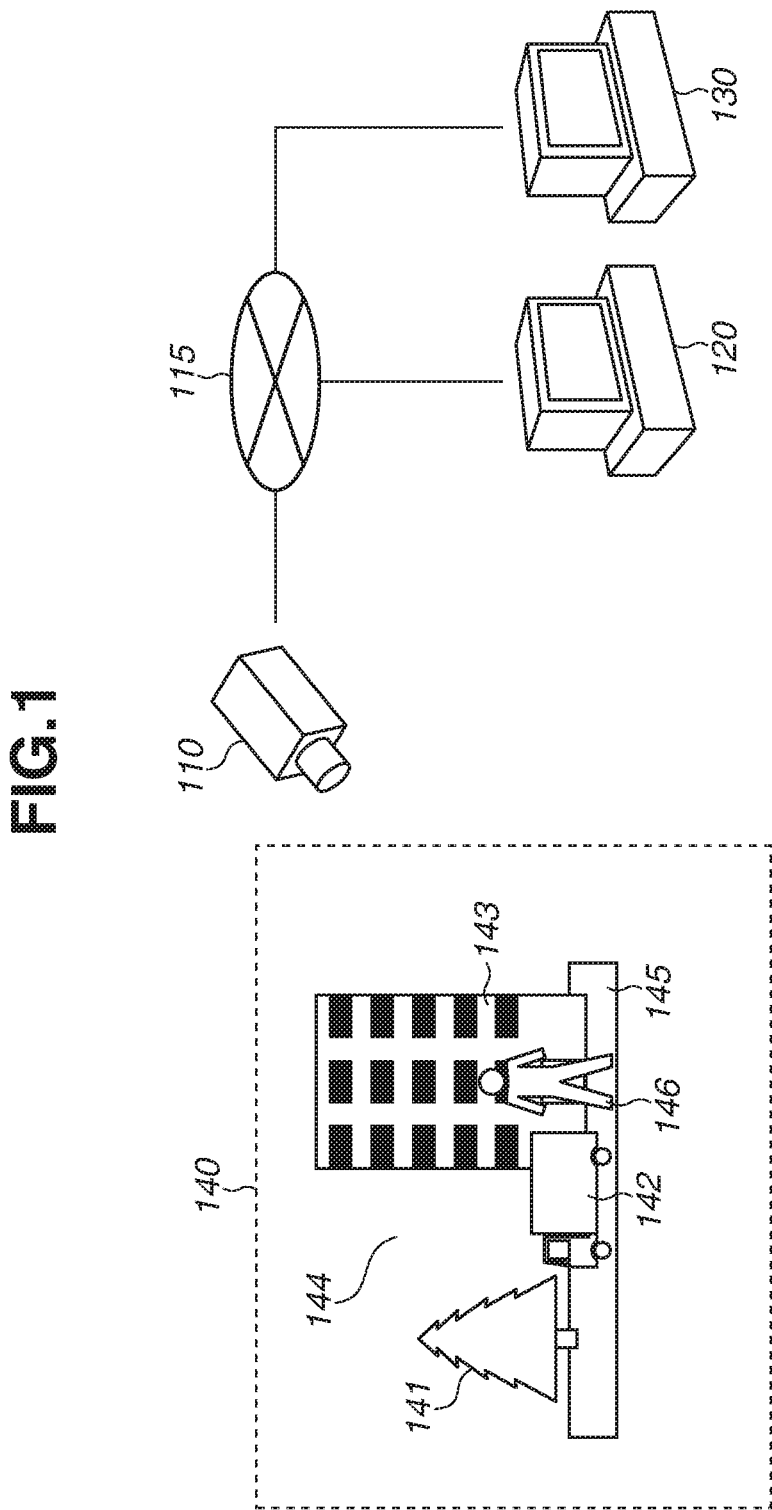

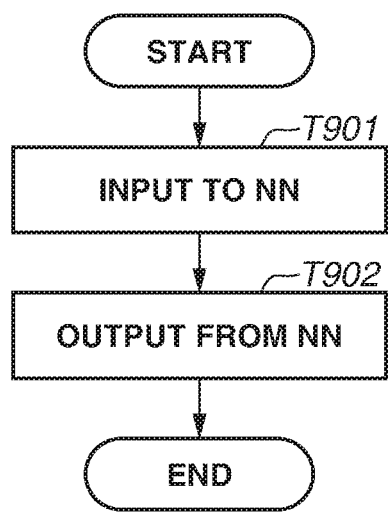 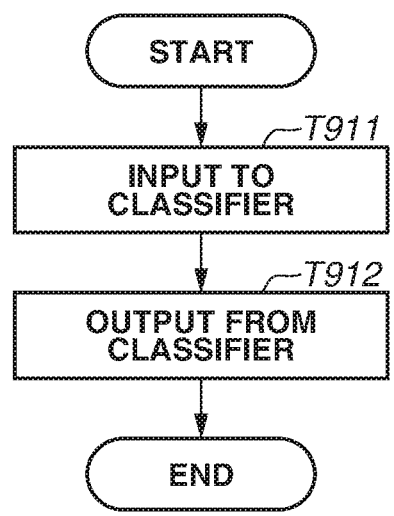

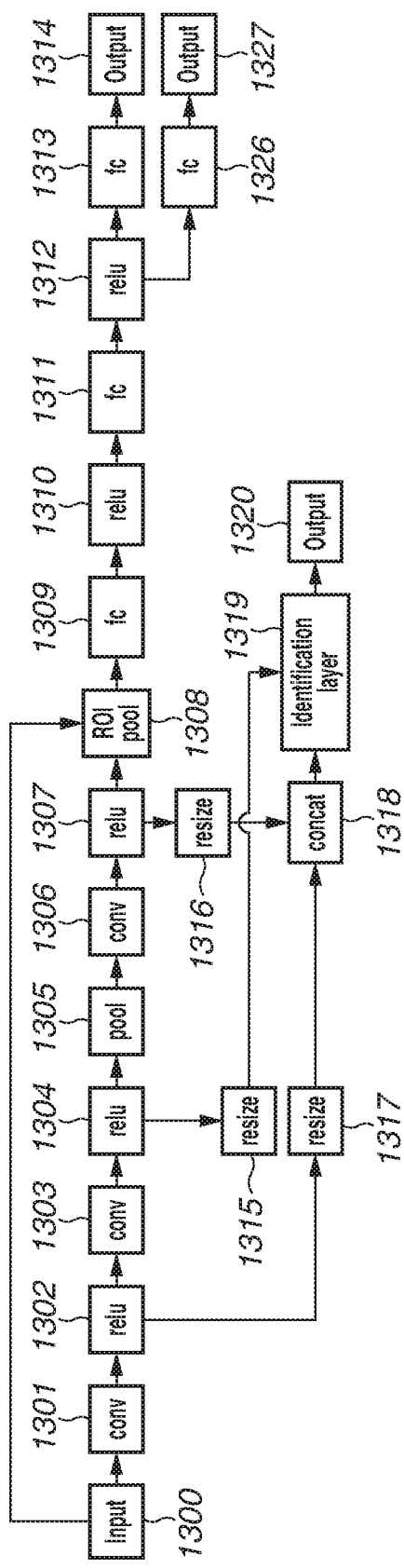
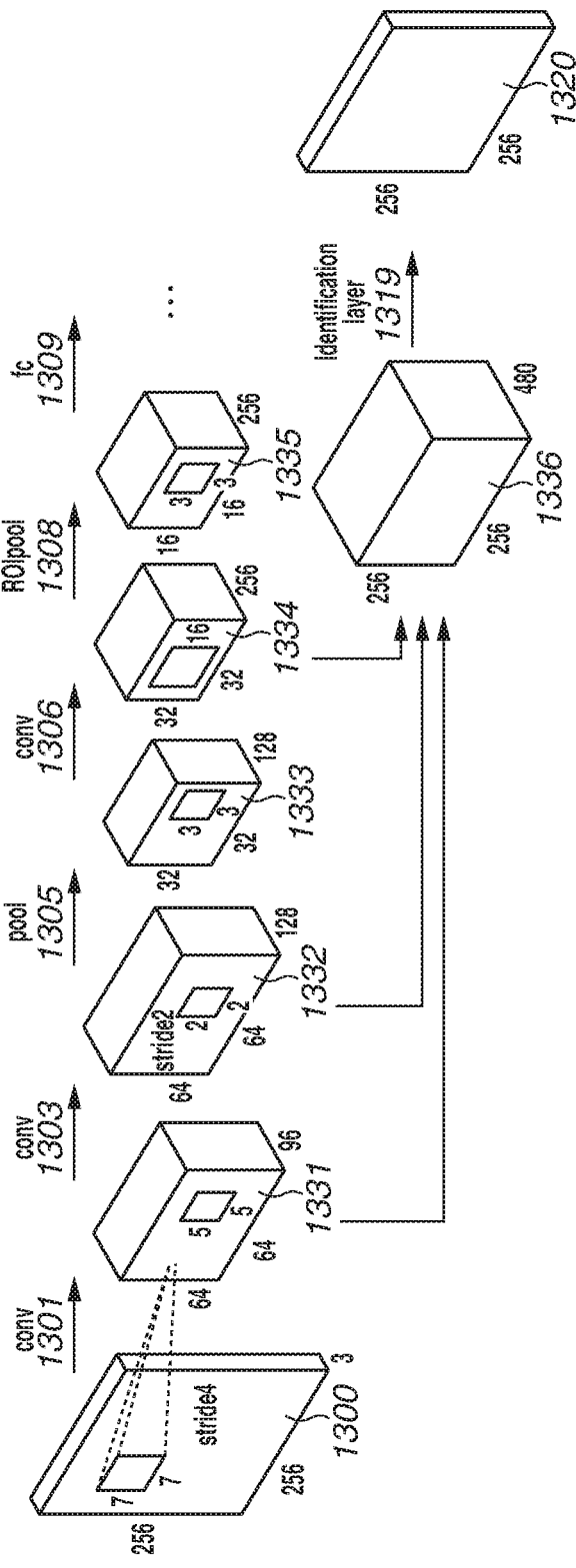
FIG.13A
FIG.13B

INFORMATION PROCESSING APPARATUS FOR TRAINING NEURAL NETWORK FOR RECOGNITION TASK AND METHOD THEREOF

BACKGROUND OF THE INVENTION

Field of the Invention

The aspect of the embodiments relates to an information processing apparatus for training a neural network for a recognition task, and a method thereof.

Description of the Related Art

There are techniques in which a machine, such as a computer, learns contents of data, such as an image and sound, and performs recognition. As employed herein, a purpose of recognition processing will be referred to as a recognition task. Examples of the recognition task include a face recognition task for detecting a human face area in an image. Other examples include various recognition tasks such as an object category recognition task for determining the category (like cat, car, and building) of an object in an image and a scene type recognition task for determining a scene category (like city, mountains, and sea shore).

Neural network (NN) techniques have been known as techniques for learning and performing such recognition tasks. A multilayer NN of large depth (with a large number of layers) is called deep neural network (DNN). As discussed in Krizhevsky, A., Sutskever, I., and Hinton, G. E., "Imagenet classification with deep convolutional neural networks" (Advances in Neural Information Processing Systems, 2012: pp. 1097-1105) (hereinafter referred to as Krizhevsky et al.), a convolutional NN of large depth is called deep convolutional neural network (DCNN). DCNNs have attracted attention recently for their high performance.

A DCNN is an NN having a network structure in which each layer performs convolution processing on an output result from the previous layer and outputs the resultant to the next layer. Each layer is provided with a plurality of filters (kernels) for convolutional operations. The last layer is an output layer for outputting a recognition result. In a DCNN, a layer close to the output layer typically is not convolutionally connected but is configured as a fully connected layer (fullconnect) like that of an ordinary NN. Alternatively, as discussed in Jeff Donahue, Yangqing Jia, Judy Hoffman, Trevor Darrell, "DeCAF: A Deep Convolutional Activation Feature for Generic Visual Recognition" (arXiv, 2013) (hereinafter referred to as Jeff Donahue et al.), a technique for inputting an output result of a convolutional layer (intermediate layer), instead of that of a fully connected layer, into a linear classifier for classification may be used.

In a DCNN training phase, the values of convolution filters and the connection weights of fully connected layers (both will be referred to collectively as training parameters) are learned from supervised data by using a method such as backpropagation (BP). In a recognition phase, data is input to the pre-trained DCNN, and the data is successively processed in each layer by using pre-trained training parameters. The recognition result is obtained either from the output layer or by aggregating and inputting output results of intermediate layers into a classifier.

In a normal DCNN, the last layer is connected to the output layer for outputting the recognition result. The number of recognition tasks for which the DCNN is trained and for which the DCNN performs recognition is one. For example, the DCNN discussed in the foregoing paper by Krizhevsky et al. is trained for a 1000-class image classification task. During recognition, the DCNN outputs the likelihood of each class for an identification target image. A plurality of output layers may be connected to a DCNN to output two or more recognition results. For example, Shuo Yang, Ping Luo, Chen Change Loy, and Xiaoou Tang, "From Facial Parts Responses To Face Detection: A Deep Learning Approach" (International Conference on Computer Vision, 2015), discusses a technique for connecting output layers that output a hair area, eye areas, a nose area, a mouth area, and a jaw area, respectively, and integrating the results of the output layers to detect a face area.

Japanese Patent Application Laid-Open No. 2016-6626 discusses a technique for simultaneously learning an identification issue whether a person is included in an input image and a regression issue about the position of a person in the input image, whereby the position of the person can be accurately detected even if part of the person is hidden. Japanese Patent Application Laid-Open No. 2017-84320 and Zhicheng Yan, Robinson Piramuthu, et al., "HD-CNN: Hierarchical Deep Convolutional Neural Network for Large Scale Visual Recognition" (International Conference on Computer Vision, 2015), discuss a technique for defining rough classes each including several detailed classes, and performing training and recognition with a task for identifying a class defined as a rough class and a task for identifying a class defined as a detailed class.

In training an NN for two or more recognition tasks simultaneously, parameters are to be learned efficiently. In other words, in training an NN for two or more recognition tasks simultaneously, training parameters are to be adjusted to improve training accuracy. Examples of the training parameters include a training rate about an error between a recognition result and a supervised value of training data, and the degree of significance between a plurality of recognition tasks. The degree of significance between tasks refers to a weight for determining a task of which training is desired to expedite, in the process of training.

There has been no technique for appropriately setting training parameters for training an NN for two or more recognition tasks simultaneously. The aspect of the embodiments is directed to setting training parameters to improve identification accuracy of recognition tasks in training an NN for two or more recognition tasks.

SUMMARY OF THE INVENTION

According to an aspect of the embodiments, an apparatus includes a task setting unit configured to set a plurality of recognition tasks for which a multilayer neural network or a classifier is trained, a training unit configured to train the multilayer neural network or the classifier for the plurality of tasks based on training data and a teaching value for the plurality of recognition tasks, an evaluation unit configured to evaluate a training result of the multilayer neural network or of the classifier by the training unit, and, a parameter setting unit configured to set a training parameter in training the multilayer neural network or the classifier for the plurality of recognition tasks, based on a result of evaluation by the evaluation unit.

Further features of the disclosure will become apparent from the following description of exemplary embodiments with reference to the attached drawings.

BRIEF DESCRIPTION OF THE DRAWINGS

FIG. 1 is a diagram illustrating a configuration example of an information processing system according to an exemplary embodiment.

FIGS. 9A and 9B are flowcharts illustrating examples of the identification processing according to the respective exemplary embodiments.

FIGS. 13A and 13B are diagrams illustrating an example of a neural network according to a first exemplary embodiment.

DESCRIPTION OF THE EMBODIMENTS

Figure 2A:
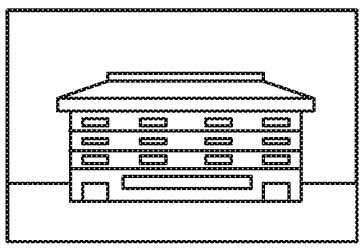
FIGS. 2A to 2C are diagrams each illustrating an example of an identification target image to be subjected to classification.

Exemplary embodiments of the disclosure will be described below with reference to the drawings.

A first exemplary embodiment of the disclosure will be described. FIG. 1 is a diagram illustrating a schematic configuration example of an information processing system according to the present exemplary embodiment. The information processing system according to the present exemplary embodiment includes a camera 110 and an information processing apparatus 120 that performs processing (identification processing) in a recognition phase related to recognition tasks. The camera 110 and the information processing apparatus 120 are connected via a network 115. The camera 110 and the information processing apparatus 120 may be integrally configured. The information processing apparatus 120 and an information processing apparatus 130 that performs processing (training processing) in a training phase related to the recognition tasks are connected via the network 115. The information processing apparatuses 120 and 130 may be integrally configured.

The camera 110 captures an image targeted for information processing by the information processing apparatus 120. FIG. 1 illustrates an example in which the camera 110 captures an image of a scene (imaging situation) 140 where a tree 141, a car 142, a building 143, the sky 144, a road 145, and a human body 146 are included as objects within an angle of view (imaging range). The information processing apparatus 120 performs a classification task, a detection task, and a segmentation task on the scene 140 captured (imaged) by the camera 110. The classification task is to identify whether each object is included in the image. The detection task is to detect the positions of objects. The segmentation task is to extract object regions. While the present exemplary embodiment is described by using the classification, detection, and segmentation tasks as examples, other tasks may be included.

Figure 2B:
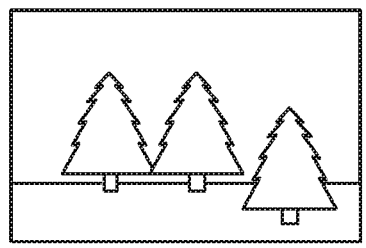
Figure 2C:
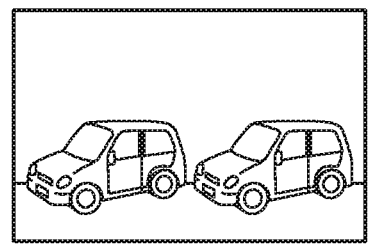
Figure 3:
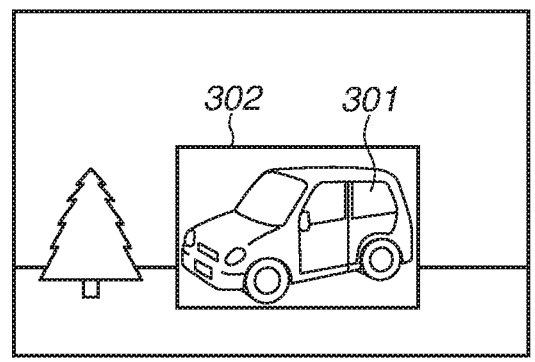
FIG. 3 is a diagram illustrating a detection example of an identification target object.
Figure 4A:
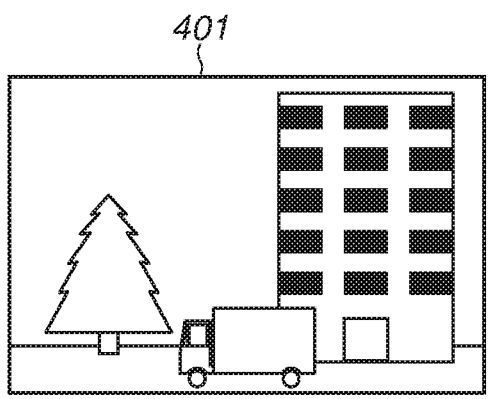
FIGS. 4A and 4B are diagrams illustrating a segmentation example of an identification target image.
Figure 4B:
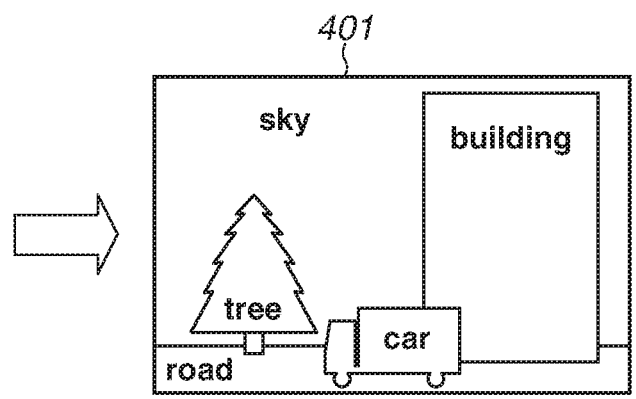

FIGS. 2A to 2C are diagrams illustrating examples of classification. FIG. 2A illustrates an example where the image is classified as an image of a building, FIG. 2B illustrates an example where the image is classified as an image of trees (woods or forest), and FIG. 2C illustrates an example where the image is classified as an image of cars. FIG. 3 is a diagram illustrating an example of detection. FIG. 3 illustrates an example where a car 301 is detected as an identification target object, and the detection result is indicated by a bounding box 302. FIGS. 4A and 4B are diagrams illustrating an example of segmentation. In the illustrated example, the class of each pixel of an identification target image 401 captured as illustrated in FIG. 4A is identified. As employed herein, classes refer to class category names related to object classification, such as sky, tree, and car, each of which are to be assigned to a corresponding pixel as illustrated in FIG. 4B.

Figure 5:
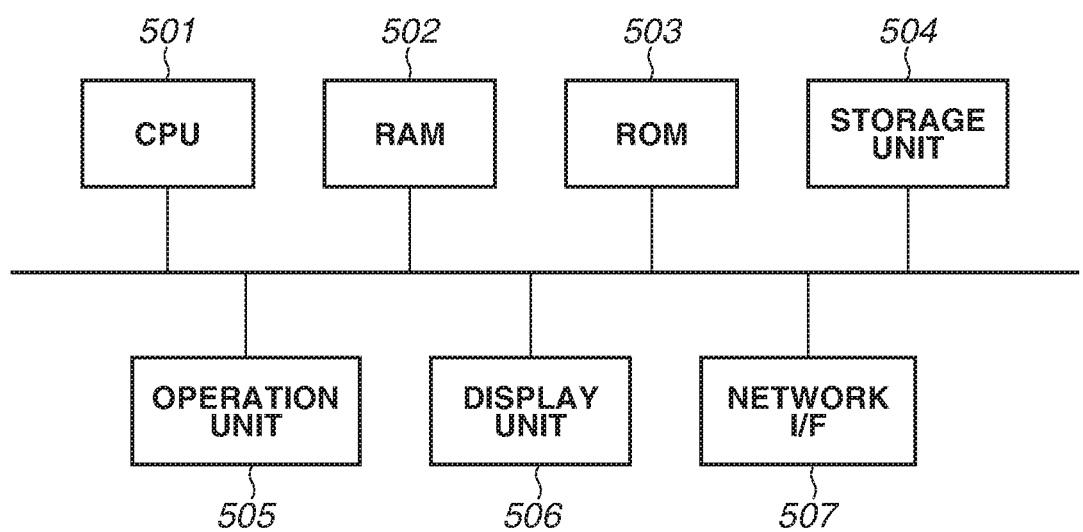
FIG. 5 is a diagram illustrating a hardware configuration example of an information processing apparatus according to the present exemplary embodiment.

FIG. 5 is a diagram illustrating an example of a hardware configuration of the information processing apparatuses 120 and 130. A central processing unit (CPU) 501 controls the entire information processing apparatus. The CPU 501 executes programs stored in a read-only memory (ROM) 503 and a storage unit 504, whereby functional configurations of the information processing apparatus to be described below and processing of a flowchart related to the information processing apparatus are implemented. A random access memory (RAM) 502 is a storage area functioning as a work area in which the CPU 501 loads and executes programs. The ROM 503 is a storage area storing programs to be executed by the CPU 501. Examples of the storage unit 504 include a hard disk drive (HDD) and a solid state drive (SSD). The storage unit 504 is a storage area storing various programs to be used when the CPU 501 performs processing, and various types of data including data on a threshold. An operation unit 505 accepts a user's input operations. A display unit 506 displays various types of information. A network interface (I/F) 507 connects the information processing apparatus with an external apparatus.

Processing (identification processing) in identifying an image by using a neural network will be described. In the following description, a deep convolutional neural network (DCNN) is described as an example. However, the neural network is not limited thereto. A DCNN is a neural network that performs a lot of convolutional operations. As discussed in the foregoing paper by Krizhevsky et al., a DCNN includes feature layers implemented by a combination of convolution processing (convolution) with nonlinear processing such as rectified linear unit (ReLU) processing and pooling processing (pooling). After the feature layers, for example, the DCNN includes a fully connected layer (full-connect), through which a classification result (likelihood of each class) is output.

Figure 6A:
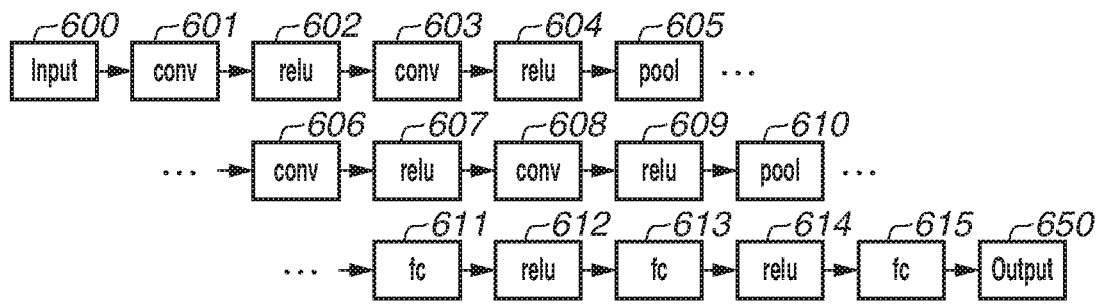
FIGS. 6A to 6D are diagrams illustrating examples of a structure of a deep convolutional neural network (DCNN) and identification processing using a DCNN.

FIGS. 6A to 6D are diagrams for describing examples of a DCNN structure and identification processing using a DCNN. FIG. 6A illustrates an example in which an input image is input as an input 600, and convolution processing 601, ReLU processing 602, convolution processing 603, ReLU processing 604, and pooling processing 605 are then performed. The processing 601 to 605 is repeated a predetermined number of times, for example, as represented by processing 606 to 610. Finally, fullconnect 611, ReLU processing 612, fullconnect 613, ReLU processing 614, and fullconnect 615 are performed to output an output result (output) 650 of the last layer. In FIG. 6A, a layer for convolution processing is denoted by "conv", a layer that performs ReLU processing is denoted by "relu", a layer that performs pooling processing is denoted by "pool", and a fully connected layer is denoted by "fc" (the same applies to FIGS. 6B to 6D).

The ReLU processing is a type of nonlinear processing. By the ReLU processing, a maximum value between an input x and 0 is output as an output y, or equivalently, a negative value in the output result of the previous layer is output as 0, as expressed by the following Eq. (1):

$$y=\max(0,x). \quad (1)$$

The ReLU processing is not restrictive, and other types of nonlinear processing may be used.

The pooling processing according to the present exemplary embodiment is max pooling processing (max pooling) for obtaining a maximum value within a predetermined range and outputting the obtained maximum value. The pooling processing is not limited to the max pooling processing, and processing for obtaining some kind of statistic within a predetermined range and outputting the obtained statistic may be used. The input image input to the DCNN is typically an image cropped or resized to a predetermined image size.

Figure 6B:
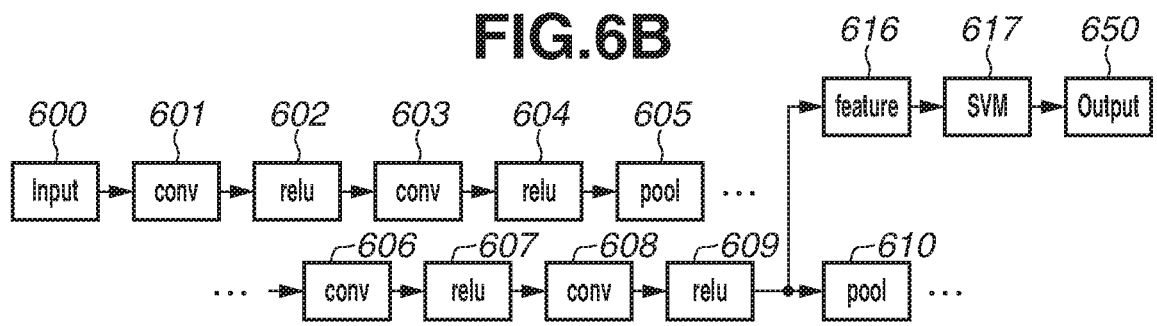

The example illustrated in FIG. 6A is not restrictive. For example, as discussed in Jeff Donahue et al., identification can be performed by inputting the output result of an intermediate layer of a neural network into a classifier as a feature vector. For example, as illustrated in FIG. 6B, identification is performed by inputting the output result of the layer performing the ReLU processing 609 that is an intermediate layer into a support vector machine (SVM) 617 as a feature vector (feature) 616. While in the example illustrated in FIG. 6B the output result of the layer performing the ReLU processing 609 halfway is used, the output result of the layer performing the convolution processing 608 in the previous stage or that of the layer performing the pooling processing 610 in the subsequent stage may be used. The output result of any other intermediate layer or a combination of such output results may be used. While in this example an SVM is used as the classifier, other classifiers may be used.

Figure 6C:
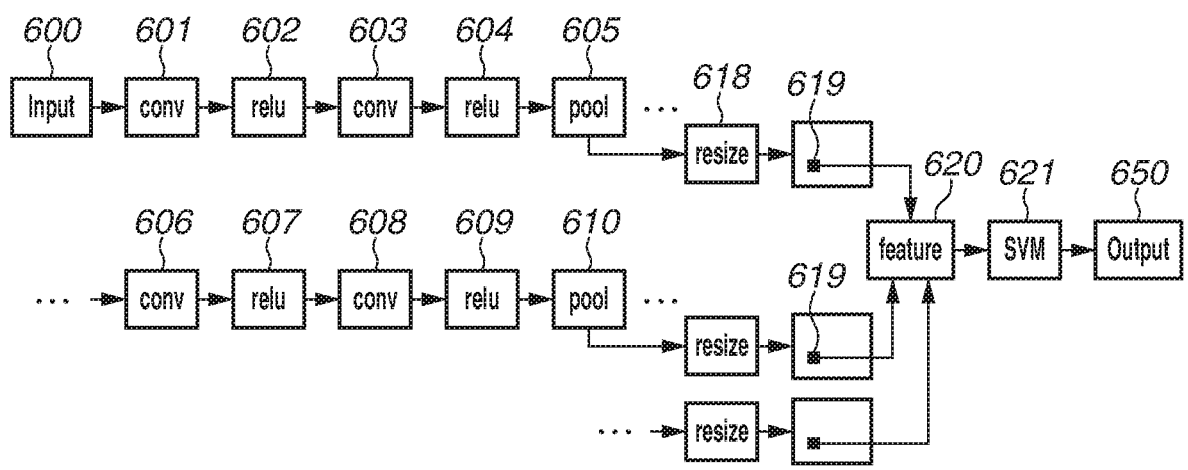

In the example illustrated in FIG. 6B, an identification result is uniquely output in response to an input image. If, as illustrated in FIGS. 4A and 4B, each individual pixel or small area is to be identified in identifying an identification target area, a configuration illustrated in FIG. 6C is used. In such a case, resize processing 618 is performed to resize the output results of predetermined intermediate layers to the same size as that of the input image (input image size). After the resize processing 618, output results 619 of predetermined intermediate layers at the pixel or small area of interest are input into an SVM 621 as a feature vector (feature) 620 for identification. If a DCNN is used, the output result of an intermediate layer typically becomes smaller than the input image size. Thus, the output result of the intermediate layer is resized to the input image size. Any interpolation technique may be used for resizing. Examples include a nearest neighbor algorithm for interpolating a value by using the that of a position nearest to the point to be interpolated. While in the foregoing example an SVM is used as the classifier, other classifiers may be used.

Figure 6D:
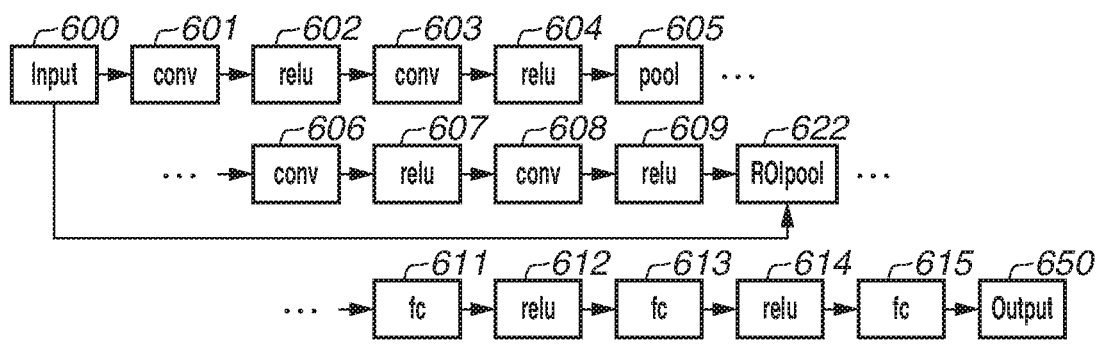

If an identification target object is detected as illustrated in FIG. 3, a neural network for estimating an object region candidate as a region of interest (ROI) and outputting a position, size, and score of a bounding box of a target object region may be used as discussed in Ross Girshick, "Fast R-CNN", International Conference on Computer Vision 2015. For example, a ROI, i.e., object region candidate is calculated by using a technique called selective search for searching for objectness, discussed in J. R. R. Uijlings, et al., "Selective Search for Object Recognition", International Journal of Computer Vision 104.2 (2013). While around 2000 object region candidates are usually calculated, the following description deals with a case where one object region candidate is calculated. As illustrated in FIG. 6D, the output result of an intermediate layer halfway is subjected to pooling processing (ROI pooling) 622 within the ROI estimated by the foregoing technique. The output result of the pooling processing within the ROI is connected to a plurality of fully connected layers to output the position and the size of the bounding box and the score of the target object.

A description will be given of processing for performing identification related to a plurality of recognition tasks by using a neural network. According to the present exemplary embodiment, two recognition tasks are performed, whereas the number of recognition tasks may be three or more. FIGS. 7A to 7D are diagrams for describing examples of DCNN-based identification processing related to a plurality of recognition tasks. FIGS. 7A to 7D illustrate examples where an identification target image is input to a neural network and identification results are output for two respective recognition tasks. FIGS. 7A to 7D illustrate the processing and not the output result of each process. Only the final identification results are illustrated in dotted lines.

Figure 7A:
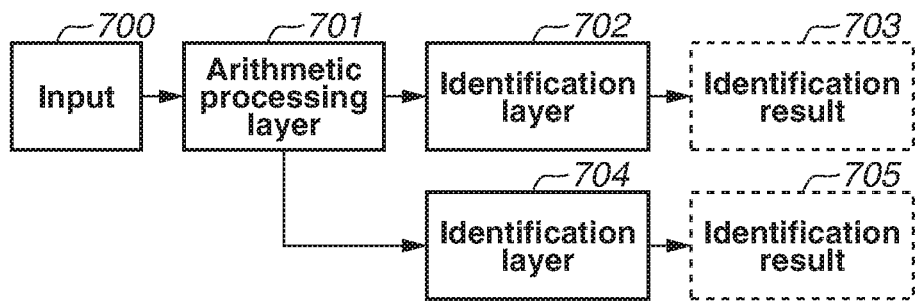
FIGS. 7A to 7D are diagrams illustrating examples of DCNN-based identification processing related to a plurality of recognition tasks.

FIG. 7A illustrates an example where an input identification target image (input) 700 is passed through an arithmetic processing layer 701, and identification results 703 and 705 for respective recognition tasks are output from identification layers 702 and 704. The arithmetic processing layer 701 includes an appropriate combination of the foregoing convolution processing with nonlinear processing such as ReLU processing and pooling processing (the same applies to other arithmetic processing layers 711, 714, and 717 illustrated in FIGS. 7B to 7D). The configuration of the arithmetic processing layer 701 is set during training of the neural network. The recognition tasks for which the neural network outputs the recognition results 703 and 705 may be any recognition tasks. Examples include a classification task, a detection task, and a segmentation task such as illustrated in FIGS. 2A to 4B.

Figure 7B:
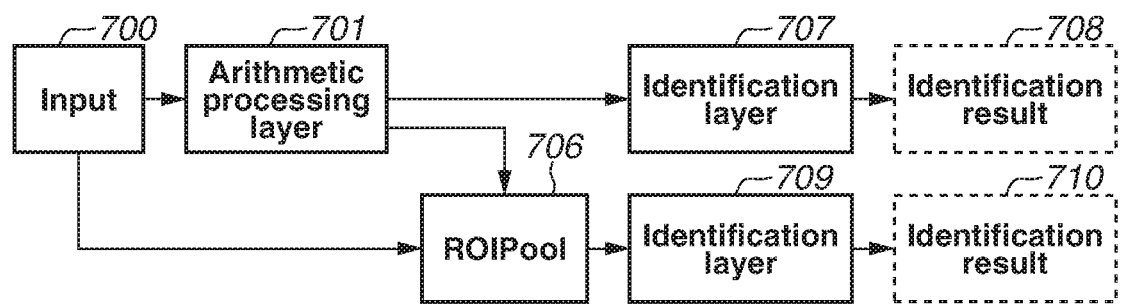

FIG. 7B illustrates an example of a case where one of the recognition tasks is a detection task. Pooling processing (ROI pooling) 706 within a ROI estimated by a predetermined method is performed on the output result of the arithmetic processing layer 701. An identification layer 709 corresponding to the detection task identifies the position and size of a bounding box by using the output result of the pooling processing within the ROI, and outputs an identification result 710. According to the present exemplary embodiment as illustrated in FIG. 7B, an identification layer 707 performs processing using the output result of the arithmetic processing layer 701, whereby an identification result 708 for the other recognition task is output. For example, the identification result 708 is a classification result, and the identification result 710 is the position and size of the target object.

Figure 7C:
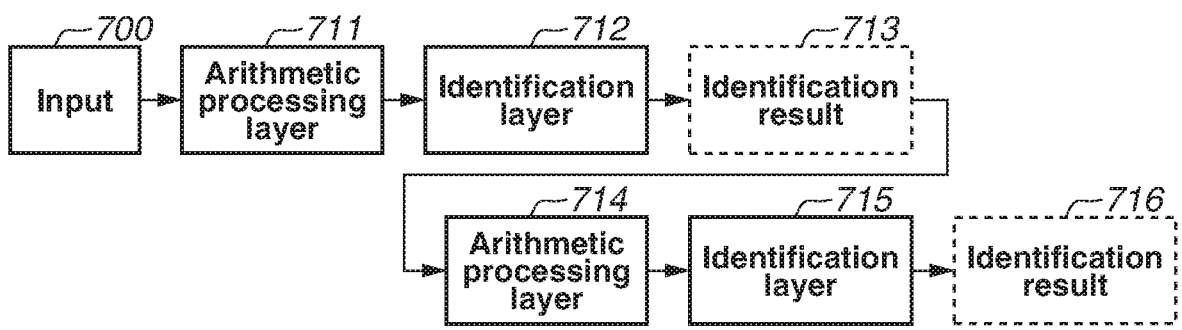
Figure 7D:
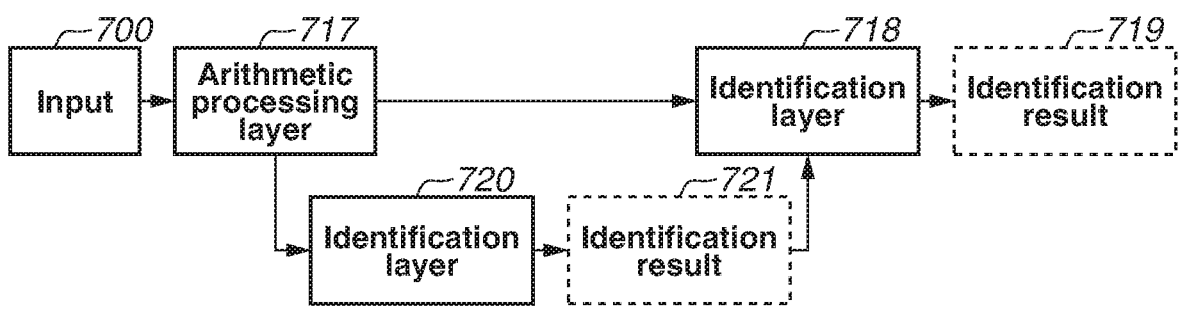

There are various methods for outputting an identification result. Examples are illustrated in FIGS. 7C and 7D. In the example illustrated in FIG. 7C, an input identification target image (input) 700 is processed in an arithmetic processing layer 711 and an identification layer 712, whereby an identification result 713 for a recognition task is output. The identification result 713 for the recognition task is then processed in an arithmetic processing layer 714 and an identification layer 715, whereby an identification result 716 for the other recognition task is output. In the example illustrated in FIG. 7D, the output result of an arithmetic processing layer 717 halfway is processed by an identification layer 720, whereby an identification result 721 for a recognition task is output. With the identification result 721 and the output result of the arithmetic processing layer 717 as inputs, an identification layer 718 performs processing to output a recognition result 719 for the other recognition task.

Figure 8A:
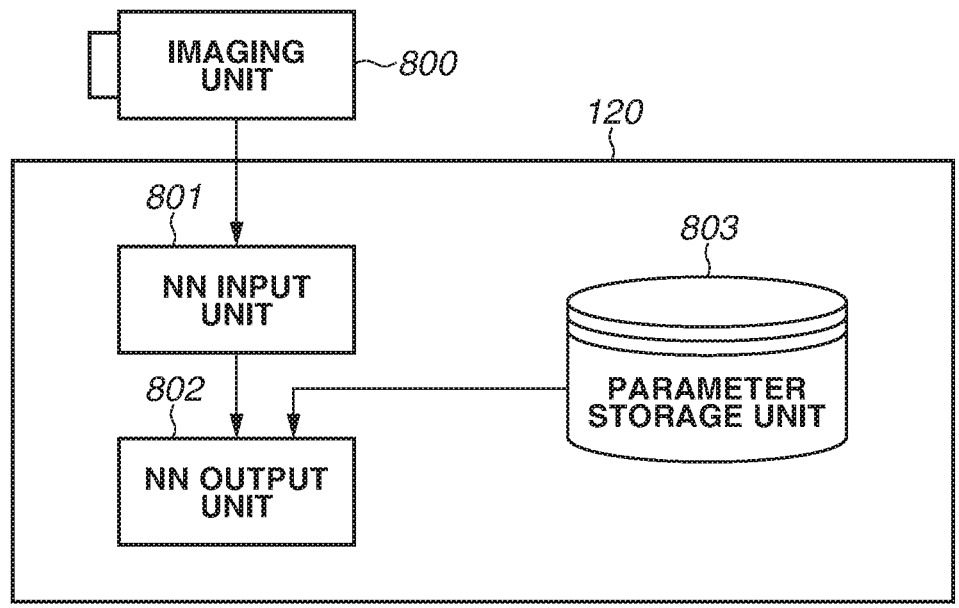
FIGS. 8A and 8B are diagrams illustrating functional configuration examples of an information processing apparatus performing identification processing according to respective exemplary embodiments.

FIG. 8A is a diagram illustrating a functional configuration example of the information processing apparatus 120 according to the first exemplary embodiment. FIG. 8A illustrates a functional configuration related to the identification processing by the information processing apparatus 120. Aside from the functional blocks of the information processing apparatus 120, FIG. 8A further illustrates an imaging unit 800 that corresponds to the camera 110 and obtains an identification target image. The information processing apparatus 120 according to the first exemplary embodiment includes a neural network (NN) input unit 801, an NN output unit 802, and a parameter storage unit 803. The NN input unit 801 and the NN output unit 802 are implemented by the CPU 501 of the information processing apparatus 120 reading a program stored in the ROM 503 or the storage unit 504 and executing the program. The parameter storage unit 803 may be configured as a nonvolatile storage device connected to the information processing apparatus 120.

FIG. 9A is a flowchart illustrating an example of the identification processing executed by the information processing apparatus 120 according to the first exemplary embodiment. If the identification processing is started, then in an NN input step T901, the NN input unit 801 obtains an image captured by the imaging unit 800, like that of the scene 140 illustrated in FIG. 1, as an identification target image. The identification target image may be an image stored in a not-illustrated external apparatus. In such a case, the NN input unit 801 obtains the image read from the external apparatus as the identification target image. Examples of the image stored in an external apparatus include an image captured by the imaging unit 800 in advance and an image obtained and stored by a different method such as via a network. The identification target image obtained by the NN input unit 801 is transmitted to the NN output unit 802.

In an NN output step T902, the NN output unit 802 identifies the identification target image input in the NN input step T901 by using an NN, and outputs the output results of output layers as identification results. The structure of the NN used for identification is stored in the parameter storage unit 803. Training parameters including the values of convolutional filters and the connection weights of fully connected layers for each recognition task of the NN used for identification are obtained by performing training in advance through training processing, and stored in the parameter storage unit 803. The identification results may be output for the respective plurality of recognition tasks set in a multitask setting step S1101 of training processing to be described below. The output result for only a predetermined recognition task among the set plurality of recognition tasks may be output.

Figure 10A:
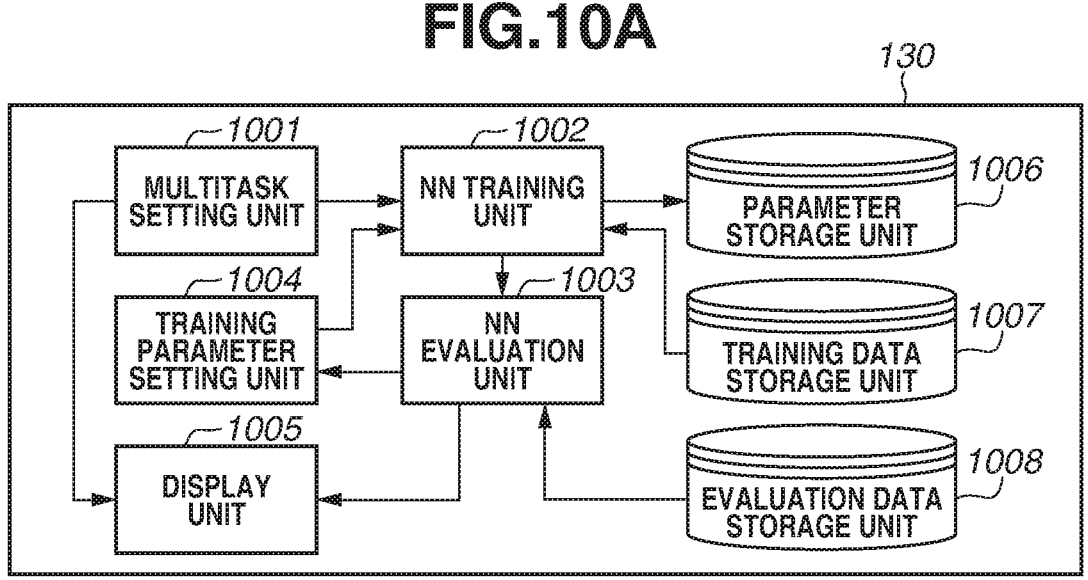
FIGS. 10A to 10C are diagrams illustrating functional configuration examples of an information processing apparatus performing training processing according to respective exemplary embodiments.

A description will be given of processing (training processing) in training the NN according to the present exemplary embodiment will be described. FIG. 10A is a diagram illustrating a functional configuration example of the information processing apparatus 130 according to the first exemplary embodiment. FIG. 10A illustrates a functional configuration related to the training processing by the information processing apparatus 130. The information processing apparatus 130 according to the first exemplary embodiment includes a multitask setting unit 1001, an NN training unit 1002, an NN evaluation unit 1003, a training parameter setting unit 1004, and a display unit 1005. The information processing apparatus 130 according to the first exemplary embodiment further includes a parameter storage unit 1006, a training data storage unit 1007, and an evaluation data storage unit 1008.

The multitask setting unit 1001, the NN training unit 1002, the NN evaluation unit 1003, and the training parameter setting unit 1004 are implemented by the CPU 501 of the information processing apparatus 130 reading a program stored in the ROM 503 or the storage unit 504 and executing the program. Part or all of the parameter storage unit 1006, the training data storage unit 1007, and the evaluation data storage unit 1008 may be configured as a nonvolatile storage device or devices connected to the information processing apparatus 130. According to the present exemplary embodiment, the information processing apparatus 130 trains an NN for a plurality of recognition tasks by using data stored in the training data storage unit 1007, and then evaluates the training accuracy of the NN and sets training parameters. However, this is not restrictive, and a pre-trained NN stored in advance may be evaluated.

Figure 11C:
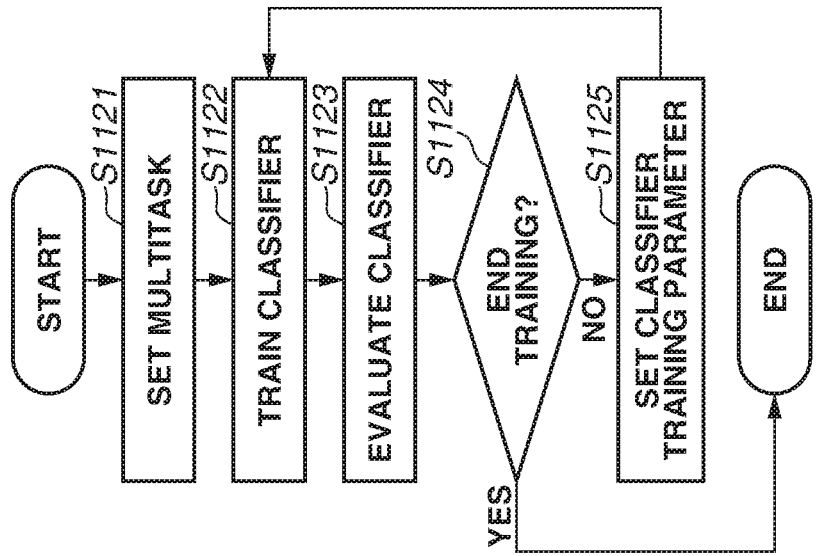
FIGS. 11A to 11C are flowcharts illustrating examples of the training processing according to the respective exemplary embodiments.
Figure 11B:
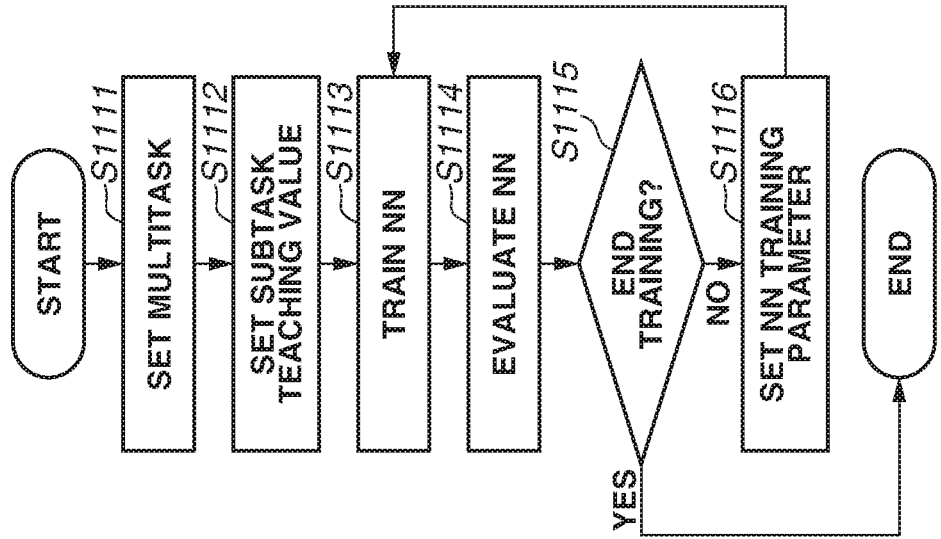
Figure 11A:
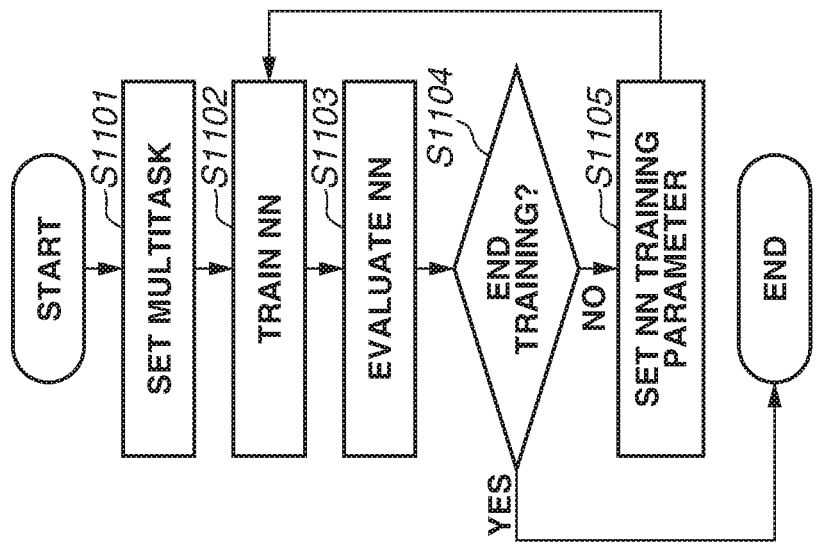

FIG. 11A is a flowchart illustrating an example of the training processing performed by the information processing apparatus 130 according to the first exemplary embodiment. If the training processing is started, then in a multitask setting step S1101, the multitask setting unit 1001 sets at least two recognition tasks for which the NN is trained. Information about the set plurality of recognition tasks is transmitted to the NN training unit 1002. The multitask setting unit 1001 is connected to the display unit 1005 and displays the set recognition tasks on the display unit 1005 so that the user can check the set recognition tasks.

Figure 12:
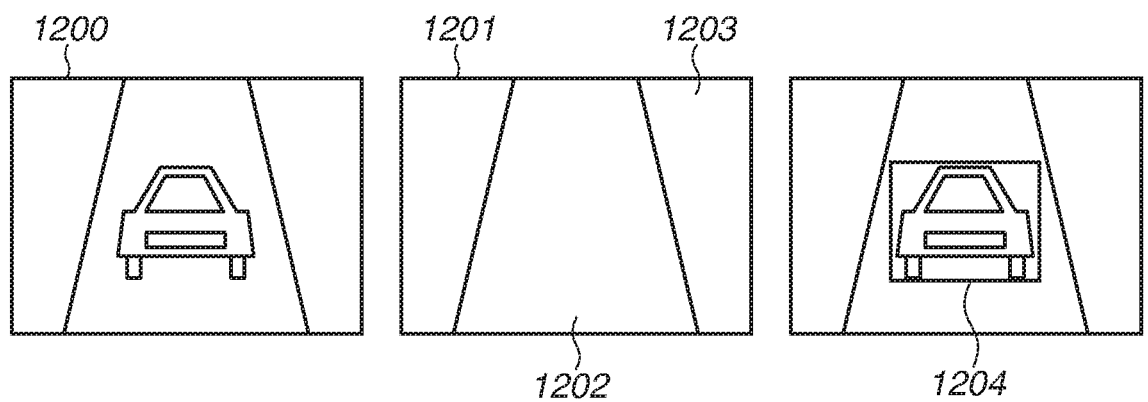
FIG. 12 is a diagram for describing an example where a segmentation task and a detection task are set.

The present exemplary embodiment will be described using a case where the number of set recognition tasks is two as an example. Examples of the set recognition tasks include two different tasks selected from among the foregoing classification, detection, and segmentation tasks. The same task may be selected twice. The present exemplary embodiment deals with an example where two recognition tasks, namely, a segmentation task and a detection task are set. The segmentation task is intended to extract road regions and others. The detection task will be described as a task for detecting a car. An example is illustrated in FIG. 12. FIG. 12 illustrates an identification target image 1200, an identification result 1201 for the segmentation task, and an identification result (bounding box) 1204 for the detection task. The identification result 1201 includes a road region 1202 and non-road regions 1203. The bounding box 1204 indicates the position and size of a car.

In an NN training step S1102, the NN training unit 1002 trains an NN using training data stored in the training data storage unit 1007 with set training parameters of the NN. In the NN training step S1102, the NN is trained for the plurality of recognition tasks set by the multitask setting unit 1001 in the multitask setting step S1101. According to the present exemplary embodiment, a DCNN is used as the NN. The set training parameters include the number of layers in the NN, the processing content (structure) of the layers, filter sizes, and the number of output channels. The trained NN is transmitted to the NN evaluation unit 1003.

An example of the trained NN will be described with reference to FIGS. 13A and 13B. FIG. 13A illustrates details of processing that is performed on an input training image in each NN layers. In FIG. 13A, an output 1314 represents the likelihood of being a target object, i.e., a result for the detection task. An output 1327 represents an output result about the position and size of the target object. An output 1320 represents an identification result for the segmentation task. The structure and processing content of the NN for each recognition task will be described.

For the detection task, an input training image (input) 1300 is subjected to convolution processing 1301, ReLU processing 1302, convolution processing 1303, ReLU processing 1304, and pooling processing 1305 in order. Convolution processing 1306, ReLU processing 1307, and pooling operation 1308 within a ROI are further performed, and the resultant is input to a fully connected layer 1309. The result (output) 1314 for the detection task is then output through the fully connected layer 1309, ReLU processing 1310, a fully connected layer 1311, ReLU processing 1312, and a fully connected layer 1313. The output result of the ReLU processing 1312 is also input to a fully connected layer 1326, whereby the output result (output) 1327 about the position and size of the target object is obtained. For the segmentation task, the output results of intermediate layers are resized to the input image size for identification. Specifically, the output result of the ReLU processing 1302, the output result of the ReLU processing 1304, and the output result of the ReLU processing 1307 are resized to the input image size by resize processing 1315, 1316, and 1317, respectively. The resultants are then subjected to concatenation processing (concat) 1318. The concatenated result is identified by an identification layer 1319, and the identification result (output) 1320 is output.

FIG. 13B illustrates the output results of layers in the NN when the processing content illustrated in FIG. 13A is performed. In FIG. 13B, ReLU processing is omitted. In the DCNN, N(n) (n=1, 2, ...) channels of input to each layer are converted into N(n+1) channels of output by convolution. A group of filters (kernels) used in each layer performing convolution processing is expressed by a fourth-order tensor representation. For example, a group of filters is expressed by (filter size)×(filter size)×(number of (input) channels)×(number of filters=number of output channels). In the case of the example illustrated in FIG. 13B, the input image 1300 is resized to a size of 256×256 and defined by red, green, and blue (RGB) three channels. The convolution processing 1301 uses filters (kernels) expressed by 7×7×3× 96. As illustrated in FIG. 13B, since the processing is performed with a stride of 4 (convolutional operation is performed at every four pixels), an output result 1331 of the convolution processing 1301 (and ReLU processing 1302) has a size expressed by 64×64×96. Next, the convolution processing 1303 uses filters expressed by 5×5×96×128. An output result 1332 of the convolution processing 1303 is then 64×64×128. Suppose that the pooling processing 1305 obtains a maximum value within the range of 2×2 with a stride of 2. An output result 1333 of the pooling processing 1305 is 32×32×128. The convolution processing 1306 uses filters expressed by 3×3×128×256. An output result 1334 of the convolution processing 1306 is 32×32×256. The output result 1334 of the convolution processing 1306 is then subjected to the pooling processing 1308 within the ROI. Here, the ROI pooling processing is performed on a region expressed by 16×16, and an output result 1335 is input to the subsequent fully connected layer 1309. The fully connected layer 1309 then performs processing to output the likelihood, position, and size of an object in the ROI.

For example, in the example illustrated in FIG. 12, likelihood whether there is a car in the ROI and the position and size of the car region are output. The fully connected layer 1313 processes the object likelihood in the ROI and outputs the likelihood of being a target object as the output result (output) 1314. During training, the NN is trained by calculating softmax errors from the training data. The fully connected layer 1326 processes the position and size of the object in the ROI and outputs the amounts of deviation in the position and size in the ROI from a target object region as the output result (output) 1327. During training, the NN is trained by calculating regression errors between the position and size in the ROI and the position and size of the target object in the training data. If the training data includes no car, only errors about the likelihood of being a target object are calculated.

For the segmentation task, the output results of layers are resized to the size of the input image and concatenated. Specifically, the output result 1331 of 64×64×96 in size from the convolution processing 1301 is resized to a size of 256×256 that is the input image size. The resizing results in 256×256×96. Nearest neighbor processing may be used as the method of the resize processing. The output result 1332 of 64×64×128 in size from the convolution processing 1303 and the output result 1334 of 32×32×256 in size from the convolution processing 1306 are also resized by a similar method. The resized output results are concatenated in the channel direction into an output result 1336 of 256×256× 480. With the output result 1336 as an input, the identification layer 1319 performs processing to output the identification result (output) 1320 in a size of 256×256. The size of the filter (kernel) used in the identification layer 1319 is thus expressed, for example, by 1×1×480×1. By such processing, an identification result is output for each of 256×256 points. During training, the NN is trained by preparing teaching values of the same size as the input image size and calculating softmax errors at respective pixels.

Return to FIG. 11A. In an NN evaluation step S1103, the NN evaluation unit 1003 evaluates the NN trained in the NN training step S1102 by using evaluation data stored in the evaluation data storage unit 1008. According to the present exemplary embodiment, the evaluation data is stored separately from the training data. However, part of the training data may be used for evaluation. The evaluation result of the NN by the NN evaluation unit 1003 is transmitted to the training parameter setting unit 1004 and the display unit 1005. The user can check the training result and the evaluation result of the NN on the display unit 1005. In step S1104, the NN evaluation unit 1003 determines whether to continue training the NN based on the evaluation result.

Figure 14:
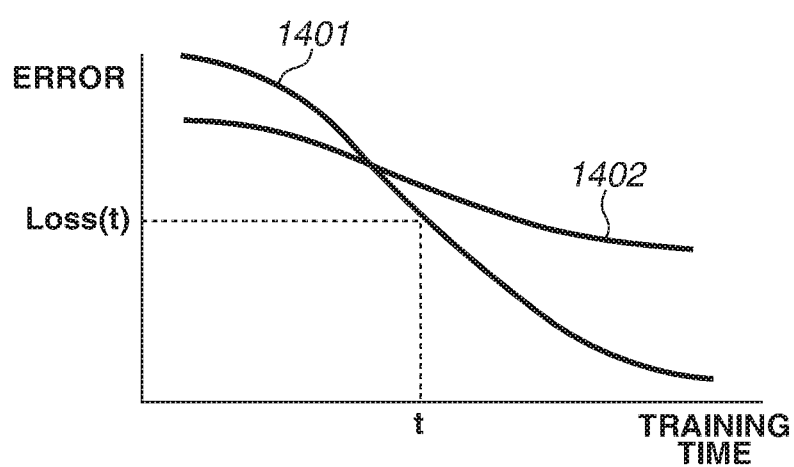
FIG. 14 is a chart illustrating an example of errors deviating from evaluation data according to the first exemplary embodiment.

According to the present exemplary embodiment, the NN evaluation unit 1003 evaluates the NN in terms of the training accuracy for the plurality of recognition tasks and the amount of displacement in the training accuracy at predetermined intervals. The training accuracy in each recognition task is evaluated using errors deviating from the evaluation data. Errors can be calculated by a method similar to that for calculating errors about the training data during training. The training accuracy for each recognition task with reference to the evaluation data is obtained, for example, as illustrated in FIG. 14. FIG. 14 is a chart illustrating errors of when the NN trained in the NN training step S1102 is evaluated using the evaluation data. An error by the NN deviating from the evaluation data at each training time t is denoted by Loss(t). FIG. 14 illustrates errors 1401 and 1402 deviating from the evaluation data in the respective recognition tasks. In a case where the errors deviating from the evaluation data in both the recognition tasks are smaller than a predetermined threshold, then in step S1104, the NN evaluation unit 1003 determines to end training (YES in step S1104). In a case where at least either one of the errors deviating from the evaluation data is greater than or equal to the predetermined threshold, then in step S1104, the NN evaluation unit 1003 determines to continue training (NO in step S1104). The processing then proceeds to an NN training parameter setting step S1105. In the NN training parameter setting step S1105, the training parameters of the NN are set using the errors deviating from the evaluation data.

In the NN training parameter setting step S1105, the training parameter setting unit 1004 sets the training parameters of the NN based on the result of evaluation in the NN evaluation step S1103 (errors deviating from the evaluation data). The set training parameters are transmitted to the NN training unit 1002. The processing of the NN training step S1102 and the NN evaluation step S1103 is then performed again with the set training parameters. The NN evaluation unit 1003 determines whether to end training, and in a case where the training is determined to be ended (YES in step S1104), the training processing ends.

Figure 15:
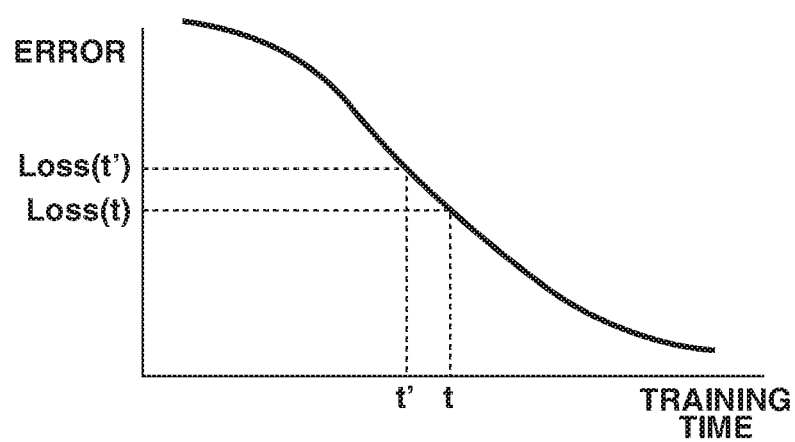
FIG. 15 is a chart for describing an error deviating from the evaluation data according to the first exemplary embodiment and an amount of displacement thereof.

According to the present exemplary embodiment, the training parameters include the degree of significance to and the training rate for each recognition task, and the training rates of NN layers related to each recognition task. The degree of significance to each recognition task is a value of weight assigned to errors in a corresponding one of the recognition task during training. The higher the degree of significance, the more the NN is trained for that recognition task. According to the present exemplary embodiment, a degree of significance W is calculated, for example, by using an error Loss(t) obtained at training time t and an error Loss(t') obtained at training time t' which is a predetermined time before the training time t as illustrated in FIG. 15. In the case of an NN, the number of times (iterations) of mini-batch training may be used as the training time. The number of epochs indicating how many times the NN is trained with all the training data may be used as the training time. The degree of significance W to each recognition task is calculated by the following Eq. (2):

$$W = \alpha \cdot Loss(t) + \beta/(\Delta Loss + \gamma). \tag{2}$$

In Eq. (2), $\alpha$, $\beta$, and $\gamma$ are constants expressed by a real number of 0 to 1 each, and $\Delta Loss$ represents the amount of displacement in error per unit time and is expressed by the following Eq. (3):

$$\Delta Loss = |Loss(t) - Loss(t')|/(t-t'). \tag{3}$$

The degree of significance W may be obtained based on a total sum during a predetermined time, as expressed by the following Eq. (4):

$$W = \Sigma(\alpha \cdot Loss(t) + \beta/(\Delta Loss + \gamma)). \tag{4}$$

Figure 16:
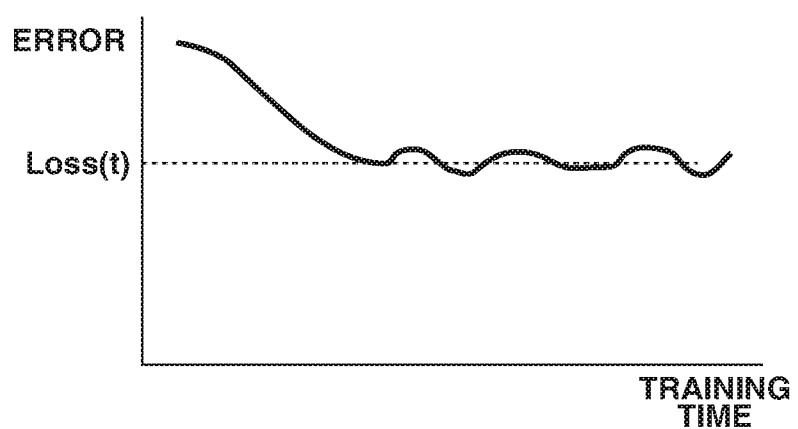
FIG. 16 is a diagram illustrating an example of an error deviating from the evaluation data according to the first exemplary embodiment.

For example, suppose, as illustrated in FIG. 16, that an error in a recognition task remains within a certain range and training does not progress. In such a case, the degree of significance W is set to a greater value to promote the training of the NN.

In the foregoing example, if the recognition task is a determination task, a regression error about the position and size of the ROI and the position and size of the target object in the training data is multiplied by the degree of significance W. If the recognition task is a segmentation task, a softmax error calculated for each pixel of the output result is multiplied by the degree of significance W. A total sum of errors E is expressed by the following Eq. (5):

$$E = Wr \cdot Er + Ws \cdot Es, \ (Wr + Ws = 1) \tag{5}$$

where Er is the regression error related to the detection task, Es is the softmax error related to the segmentation task, Wr and Ws are the degrees of significance W to the tasks Er and Es, respectively.

The NN can be trained through backpropagation by using the error E thus calculated, weighted by the degrees of significance W.

While the errors are multiplied by the calculated degrees of significance W, a function to which a degree of significance W and a training time t are input may be defined to change the degrees of significance W at each training time, as expressed by the following Eq. (6):

$$W = f(W,t). \tag{6}$$

Even in such a case, the degrees of significance W to the recognition tasks are normalized in such a manner that the total sum is 1. By using such degrees of significance W, the NN is trained again in the NN training step S1102. While, according to the present exemplary embodiment, errors deviating from the evaluation data at each training time are used, other evaluation values may be used. For example, if a rate of correct answers to the evaluation data is used, an F value calculated from the rate of correct answers and the reproducibility of the evaluation data or the reproducibility at a predetermined misdetection rate may be calculated. Alternatively, statistics may be calculated from the identification results of samples of the evaluation data for the respective recognition tasks.

The errors deviating from the evaluation data in the recognition tasks at each training time may be displayed on the display unit 1005, and the user may observe the errors and set the degrees of significance W. According to the present exemplary embodiment, a parameter for the next training of the NN is set using the errors by the trained NN deviating from the evaluation data. A plurality of training parameters may be set based on errors deviating from the evaluation data, and NNs may be trained with the respective training parameters for a predetermined time. Then, an NN having the highest identification accuracy may be selected. A training parameter may be set based on the identification accuracy of a recognition task selected among the plurality of recognition tasks for which the NN is trained.

According to the first exemplary embodiment, the information processing apparatus 130 sets two or more recognition tasks for which an NN is trained, evaluates results of training for the recognition tasks, and sets training parameters of the NN. By such processing, when an NN is trained for two or more recognition tasks, the training for the plurality of recognition tasks can be performed with appropriately set training parameters. This enables efficient training of an NN having high identification accuracy.

A second exemplary embodiment of the disclosure will be described. According to the second exemplary embodiment, in addition to the processing according to the first exemplary embodiment, one or more of a plurality of recognition tasks are generated from other tasks. A generating recognition task will hereinafter be referred to as a main task, and a generated recognition task as a subtask. For example, if a main task is a detection task, a task (classification task) for identifying whether there is a target object in an image is set as a subtask. Since data indicating the position of the target object in training data is input as a teaching value for the main task, a teaching value for the subtask about whether there is the target object in the image can be automatically generated. Training parameters for the main task and the subtask are set to improve the accuracy of the detection task that is the main task.

In training a multilayer NN, too many training parameters can cause the trained multilayer NN to diverge or to converge to a local minimum depending on the training data or the recognition task to be learned. According to the present exemplary embodiment, a subtask is set aside from the recognition task to be learned (main task), and training parameters with which the NN is trained for the main task and the subtask are adjusted to improve the training accuracy of the main task. Since teaching values for the subtask are generated based on those of the main task, the class definitions of the subtask include those of the main task. Between the main task and the subtask, the subtask is a recognition task intended for an easier issue. In an early stage of training, the degree of significance to the subtask is set high and that to the main task is set low to promote the training of the NN. As the training progresses, the degree of significance to the subtask is decreased and that to the main task is increased to promote training for the main task.

According to the second exemplary embodiment, the processing in identifying an image is similar to that of the first exemplary embodiment. A description will be then given of processing during training. In an NN output step T902 according to the second exemplary embodiment, only the identification result for the main task set during training may be output without outputting the identification result for the subtask generated based on the main task.

Figure 10B:
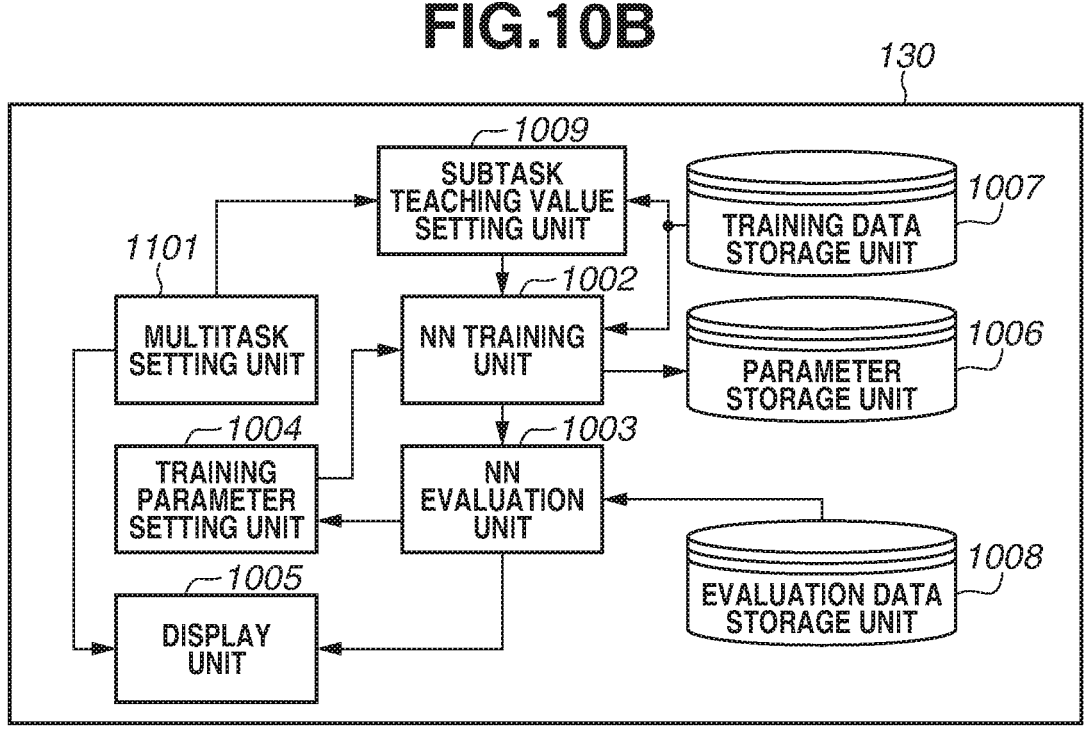

FIG. 10B is a diagram illustrating a functional configuration example of an information processing apparatus 130 according to the second exemplary embodiment. FIG. 10B illustrates a functional configuration related to the training processing by the information processing apparatus 130. In FIG. 10B, blocks having functions similar to those of the blocks illustrated in FIG. 10A are designated by the same reference numbers. A redundant description will be omitted.

The information processing apparatus 130 according to the second exemplary embodiment includes a multitask setting unit 1001, an NN training unit 1002, an NN evaluation unit 1003, a training parameter setting unit 1004, and a display unit 1005. The information processing apparatus 130 according to the second exemplary embodiment also includes a parameter storage unit 1006, a training data storage unit 1007, an evaluation data storage unit 1008, and a subtask teaching value setting unit 1009. The multitask setting unit 1001, the NN training unit 1002, the NN evaluation unit 1003, the training parameter setting unit 1004, and the subtask teaching value setting unit 1009 are implemented by a CPU 501 of the information processing apparatus 130 executing a program stored in a ROM 503.

FIG. 11B is a flowchart illustrating an example of training processing performed by the information processing apparatus 130 according to the second exemplary embodiment. If the training processing is started, then in a multitask setting step S1111, the multitask setting unit 1001 sets two or more recognition tasks for which an NN is trained, similar to the first exemplary embodiment. According to the present exemplary embodiment, the definitions and teaching values of one or more recognition tasks (subtask(s)) among the plurality of recognition tasks are generated from those of other recognition tasks. In the multitask setting step S1111, the multitask setting unit 1001 is to set a subtask or subtasks of which the definitions and teaching values can be generated from a recognition task or tasks that is/are a main task or tasks. According to the present exemplary embodiment, a description will be given of a case where a detection task is set as a main task, a classification task for determining whether there is a target object in the image is set as a subtask, and an NN is trained for such a plurality of recognition tasks.

Any subtask may be set in the multitask setting step S1111 as long as the subtask can be generated from the training data of the main task. For example, a detection task may be set as the main task, and a classification task for determining whether there is a target object within a predetermined range of positions or with a predetermined size in the image may be set as the subtask. Alternatively, the subtask may be a detection task, like the main task, but with quantized position definitions. If the main task is a classification task with 1000 classes, the subtask may be, for example, a classification task with 20 classes each including more than one of the 1000 class definitions. The class definitions to be included may be set by the user or by clustering the training data based on image features.

In a subtask teaching value setting step S1112, the subtask teaching value setting unit 1009 sets teaching values for the training data of the subtask among the recognition tasks set in the multitask setting step S1111. According to the present exemplary embodiment, the main task is a detection task and the subtask is a classification task related to a target object. The teaching values for the subtask can thus be automatically generated from the training data stored in the training data storage unit 1007. An example of training data to which the position and size of one or more target objects are attached is an image in which the target object(s) exist(s).

In an NN training step S1113, the NN training unit 1002 trains the NN using the set teaching values of the training data. The processing of the NN training step S1113, the NN evaluation step S1114, and step S1115 are similar to that of the NN training step S1102, the NN evaluation step S1103, and step S1104 according to the first exemplary embodiment. A description thereof will thus be omitted.

A description will be given of the processing of an NN training parameter setting step S1116. The processing of the NN training parameter setting step S1116 is almost the same as that of the NN training parameter setting step S1105 according to the first exemplary embodiment. However, the training parameters of the NN are set to improve the training accuracy of the main task.

Figure 17A:
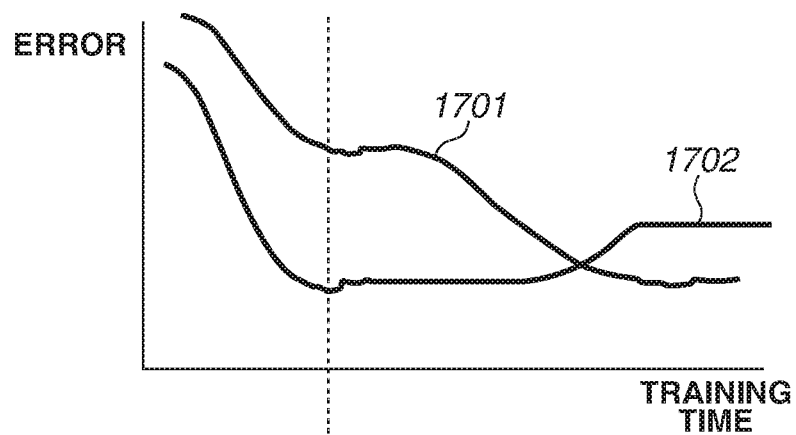
FIGS. 17A and 17B are diagrams for describing setting examples of training parameters according to a second exemplary embodiment.
Figure 17B:
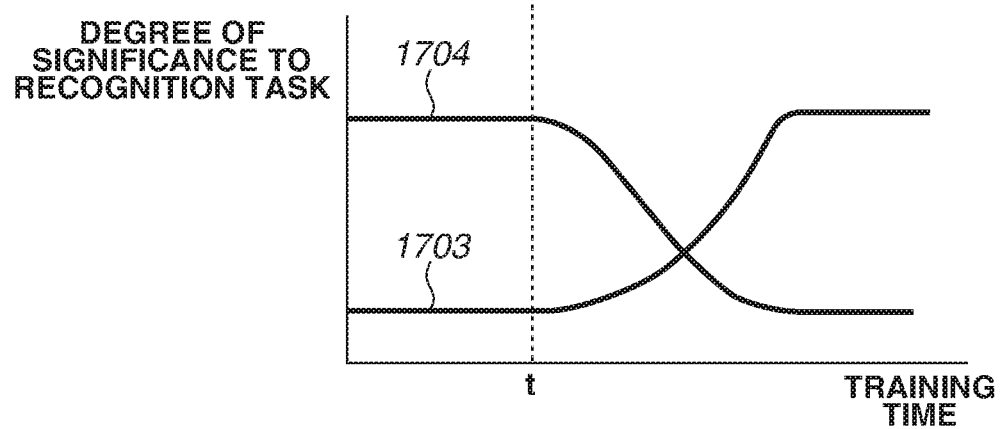

FIGS. 17A and 17B illustrate examples of errors deviating from the evaluation data in the main task and the subtask obtained at each training time and the degrees of significance set based on the errors. FIG. 17A illustrates an error 1701 deviating from the evaluation data in the main task and an error 1702 deviating from the evaluation data in the subtask. FIG. 17B illustrates a degree of significance 1703 to the main task and a degree of significance 1704 to the subtask. For example, like the first exemplary embodiment, the degrees of significance at training time t are calculated from the errors deviating from the evaluation data in the main task and the subtask, and the errors in the main task and the subtask are then multiplied by the degrees of significance to train the NN. A total sum of errors E is expressed by the following Eq. (7):

$$E = W_{sub} \cdot E_{sub} + W_{main} \cdot E_{main}, \quad (7)$$

where Wsub is the degree of significance to the subtask, Wmain is the degree of significance to the main task, and Esub and Emain are the errors related to the subtask and the main task, respectively.

The higher the degree of significance to the main task is set, the more the training for the main task is promoted. The training accuracy of the main task can be improved by gradually decreasing the degree of significance to the subtask and increasing the degree of significance to the main task as illustrated in FIG. 17B. In the NN training step S1113, the NN is trained again by using such degrees of significance. In the NN evaluation step S1114, the NN is evaluated again. The processing of the NN training parameter setting step S1116, the NN training step S1113, and the NN evaluation step S1114 is repeated until the training is determined to be ended.

The errors deviating from the evaluation data in the respective recognition tasks at each training time may be displayed on the display unit 1005, and the user may observe the errors and set the degrees of significance. While the degrees of significance to the recognition tasks are set by using errors during training, the training of the NN is likely to be promoted if the degree of significance to the subtask is increased in the early stage of training. The degree of significance to the subtask may therefore be set high and the degree of significance to the main task low until a predetermined training time, and then the degrees of significance may be adjusted using errors deviating from the evaluation data in the tasks after the predetermined time.

According to the second exemplary embodiment, the information processing apparatus 130 sets a main task for which an NN is trained and a subtask that can be generated from the main task. The information processing apparatus 130 then trains the NN for the set main task and subtask, evaluates the training result for the main task, and sets the training parameters of the NN. Such processing enables efficient training of a NN having high identification accuracy for the main task.

Next, a third exemplary embodiment of the disclosure will be described. In the third exemplary embodiment, unlike the foregoing first and second exemplary embodiments, a classifier different from an NN is trained. Examples of the classifier include an SVM and a linear discriminator. A classifier such as an SVM is typically trained by processing called batch processing that uses all training data during training. On the other hand, an NN is trained (parameters are updated) as needed by processing called mini-batch processing that uses part of training data. If a classifier such as an SVM is trained online by using a technique discussed in Shai Shalev-Shwartz, "Pegasos: Primal Estimated sub-GrAdient SOlver for SVM", International Conference on Machine Learning 2007, training accuracy can be evaluated to determine training parameters as described in the first and second exemplary embodiments. Even in the case of training by normal batch processing, training results can be evaluated to determine training parameters in performing training again. Such a method will be described below.

A description will be given of processing in identifying an identification target image will be described.

Figure 8B:
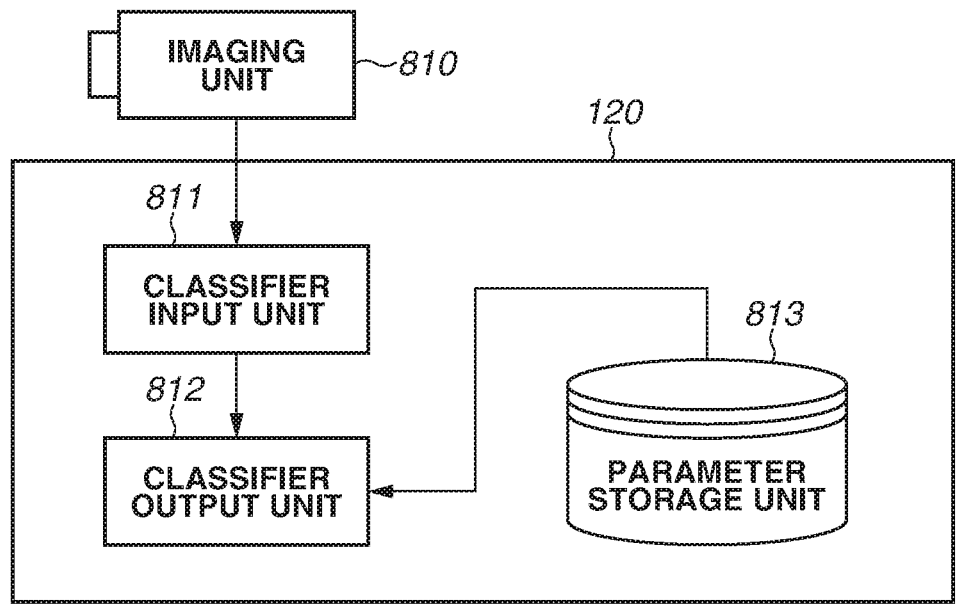

FIG. 8B is a diagram illustrating a functional configuration example of an information processing apparatus 120 according to the third exemplary embodiment. FIG. 8B illustrates a functional configuration related to identification processing by the information processing apparatus 120. Aside from the functional blocks of the information processing apparatus 120, FIG. 8B also illustrates an imaging unit 810 that corresponds to a camera 110 and obtains an identification target image. The information processing apparatus 120 according to the third exemplary embodiment includes a classifier input unit 811, a classifier output unit 812, and a parameter storage unit 813. The classifier input unit 811 and the classifier output unit 812 are implemented by a CPU 501 of the information processing apparatus 120 reading a program stored in a ROM 503 or a storage unit 504 and executing the program. The parameter storage unit 813 may be configured as a nonvolatile storage device connected to the information processing apparatus 120.

FIG. 9B is a flowchart illustrating an example of identification processing performed by the information processing apparatus 120 according to the third exemplary embodiment. If the identification processing is started, then in a classifier input step T911, the classifier input unit 811 obtains an image captured by the imaging unit 810 as an identification target image. The identification target image may be an image stored in a not-illustrated external apparatus. In such a case, the classifier input unit 811 obtains the image read from the external apparatus an identification target image. Examples of the image stored in the external apparatus include an image captured in advance by the imaging unit 810 and an image obtained and stored by other methods such as via a network. The identification target image obtained by the classifier input unit 811 is transmitted to the classifier output unit 812.

In a classifier output step T912, the classifier output unit 812 identifies the identification target image input in the classifier input step T911 by using a classifier, and outputs identification results. The identification results may be output for a respective plurality of recognition tasks set in a multitask setting step S1121 of training processing to be described below. An output result for only a set predetermined recognition task among the plurality of recognition tasks may be output.

Figure 10C:
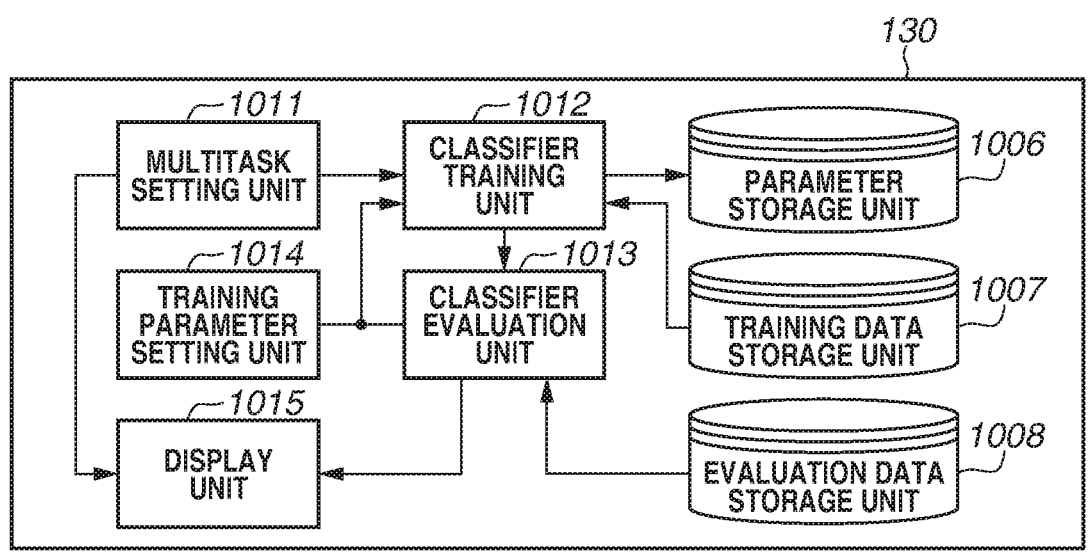

A description will be given of processing (training processing) in training the classifier used in the present exemplary embodiment. FIG. 10C is a diagram illustrating a functional configuration example of an information processing apparatus 130 according to the third exemplary embodiment. FIG. 10C illustrates a functional configuration related to the training processing by the information processing apparatus 130. The information processing apparatus 130 according to the third exemplary embodiment includes a multitask setting unit 1011, a classifier training unit 1012, a classifier evaluation unit 1013, a training parameter setting unit 1014, and a display unit 1015. The information processing apparatus 130 according to the third exemplary embodiment also includes a parameter storage unit 1006, a training data storage unit 1007, and an evaluation data storage unit 1008.

The multitask setting unit 1011, the classifier training unit 1012, the classifier evaluation unit 1013, and the training parameter setting unit 1014 are implemented by a CPU 501 of the information processing apparatus 130 reading a program stored in a ROM 503 or a storage unit 504 and executing the program. Part or all of the parameter storage unit 1006, the training data storage unit 1007, and the evaluation data storage unit 1008 may be configured as a nonvolatile storage device or devices connected to the information processing apparatus 130. According to the present exemplary embodiment, the information processing apparatus 130 trains a classifier for a plurality of recognition tasks by using data stored in the training data storage unit 1007, and then evaluates the classifier and sets training parameters. However, this is not restrictive, and a pre-trained classifier stored in advance may be evaluated.

FIG. 11C is a flowchart illustrating an example of training processing performed by the information processing apparatus 130 according to the third exemplary embodiment. If the training processing is started, then in a multitask setting step S1121, the multitask setting unit 1011 sets at least two or more recognition tasks for which a classifier is trained. Information about the set plurality of recognition tasks is transmitted to the classifier training unit 1012. The multitask setting unit 1011 is connected to the display unit 1015, and displays the set recognition tasks on the display unit 1015 so that the user can check the set recognition tasks.

In a classifier training step S1122, the classifier training unit 1012 trains the classifier using training data stored in the training data storage unit 1007 with the set training parameters of the classifier. In the classifier training step S1122, the classier is trained for the plurality of recognition tasks set by the multitask setting unit 1011 in the multitask setting step S1121. According to the present exemplary embodiment, for the sake of simplicity, a linear discriminator is used as the classifier. The trained classifier is transmitted to the classifier evaluation unit 1013.

A linear discriminator directly estimates a class from a feature amount input to the classifier. Projection based on Fisher's linear discrimination facilitates class separation. According to Fisher's linear discrimination, for a K-class recognition problem, (K−1) discriminant vectors V={V1, . . . , V(k−1)} that minimize variations within data belonging to the same class (intra-class variance) and maximize variations in average data between different classes (interclass variance) are determined. In other words, for N pieces of data, an interclass variance matrix $S_b$ and an intra-crass variance matrix $S_w$ are determined, and V that maximizes a degree of class separation J(V) expressed by the following Eq. (8) is determined:

$$J(V) = tr\{(V^T S_w V)^{-1}(V^T S_b V)\}, \quad (8)$$

where tr{·} represents the trace of the matrix.

V that maximizes the degree of class separation J(V) expressed by Eq. (8) can be determined by solving a generalized eigenvalue issue. With two recognition tasks, the interclass variance of each recognition task should be increased and the intra-class variance should be decreased. The degree of class separation J(V) is then given by the following Eq. (9):

$$J(V) = tr\{(V^T S_{1w} V)^{-1}(V^T S_{1b} V) + (V^T S_{2w} V)^{-1}(V^T S_{2b} V)\}, \quad (9)$$

where $S_{1b}$ and $S_{2b}$ are the interclass variance matrixes for the respective recognition tasks, and $S_{1w}$ and $S_{2w}$ the intra-class variance matrixes.

During identification, a classification result y for an input x is determined using the determined discriminant vector V, as expressed by the following Eq. (10):

$$y(x) = V^T x + V_0. \quad (10)$$

For generalized prediction of posterior probabilities, Eq. (10) is generalized by a nonlinear function f(·) as expressed by the following Eq. (11):

$$y(x) = f(V^T x + V_0). \quad (11)$$

In Eq. (11), f(·) will be referred to as an activation function.

In a classifier evaluation step S1123, the classifier evaluation unit 1013 evaluates the classifier trained in the classifier training step S1122 by using evaluation data stored in the evaluation data storage unit 1008. According to the present exemplary embodiment, the evaluation data is stored separately from the training data. However, part of the training data may be used for evaluation. The evaluation result of the classifier by the classifier evaluation unit 1013 is transmitted to the training parameter setting unit 1014 and the display unit 1015. The user can check the training result and the evaluation result of the classifier on the display unit 1015.

In step S1124, the classifier evaluation unit 1013 determines whether to continue training the classifier based on the result of evaluation by the classifier evaluation unit 1013 in the classifier evaluation step S1123. In a case where the training of the classifier is determined to be continued (NO in step S1124), the processing proceeds to a classifier training parameter setting step S1125. In a case where the training of the classifier is determined to not be continued, i.e., the training is determined to be ended (YES in step S1124), the training processing ends.

In the classifier training parameter setting step S1125, the training parameter setting unit 1014 sets the training parameters of the classifier based on the evaluation result in the classifier evaluation step S1123. The set training parameters are transmitted to the classifier training unit 1012. The processing of the classifier training step S1122 and the classifier evaluation step S1123 is then performed again with the set training parameters. In step S1124, whether to end the training is determined. In a case where the training is determined to be ended (YES in step S1124), the training processing ends.

The processing of the classifier evaluation step S1123 and the classifier training parameter setting step S1125 in the case of batch training will be described. According to the present exemplary embodiment, in the classifier evaluation step S1123, the classifier evaluation unit 1013 evaluates the rate of correct answers to the evaluation data from the trained classifier. In the classifier training parameter setting step S1125, the training parameter setting unit 1014 calculates the degrees of significance W based on the rate of correct answers for each recognition task evaluated in the classifier evaluation step S1123, as expressed by the following Eq. (12):

$$W = \alpha \cdot (1 - \text{rate of correct answers}(t)) + \beta. \quad (12)$$

In Eq. (12), α and β are constants, and t represents the number of times of training, not the training time. The classifier is trained again using the degrees of significance W calculated by Eq. (12). Specifically, the degrees of significance $W_1$ and $W_2$ to the respective recognition tasks are used in determining the discriminant vector V as expressed by the following Eq. (13):

$$J(V) = tr\{W_1(V^T S_{1w} V)^{-1}(V^T S_{1b} V) + W_2(V^T S_{2w} V)^{-1}(V^T S_{2b} V)\}. \quad (13)$$

The rest of the processing is similar to that of the first and second exemplary embodiments.

According to the third exemplary embodiment, the information processing apparatus 130 sets two or more recognition tasks for which a classifier is trained, evaluates the training results for the recognition tasks, and sets training parameters of the classifier. In training the classifier for two or more recognition tasks, such processing enables the training related to the plurality of recognition tasks to be performed with appropriately set training parameters. A classifier having high recognition accuracy can thus be trained efficiently.

The foregoing exemplary embodiments are just a few examples of implementation in carrying out the disclosure, and the interpretation of the technical scope of the disclosure should not be limited thereto. An exemplary embodiment of the disclosure can be practiced in various forms without departing from the technical concept or principle features of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-085259, filed Apr. 26, 2018, which is hereby incorporated by reference herein in its entirety.

What is claimed is:
1. An apparatus comprising:
a processor; and
a memory coupled to the processor storing instructions that, when executed by the processor, cause the processor to function as:
a task setting unit configured to set a plurality of recognition tasks for which a neural network or a classifier is trained, wherein the plurality of recognition tasks is to recognize targets different from each other;
a training unit configured to train the neural network or the classifier for the plurality of tasks based on training data and a teaching value for the plurality of recognition tasks;
an evaluation unit configured to evaluate a training result of the neural network or of the classifier; and
a parameter setting unit configured to set a training parameter including weight assigned to errors in the plurality of recognition tasks in training the neural network or the classifier for the plurality of recognition tasks, based on a result of evaluation by the evaluation unit,
wherein the training unit performs second training on the neural network or the classifier according to the training parameter set by the parameter setting unit based on the result of evaluation of first training by the evaluation unit.

2. The apparatus according to claim 1, wherein the evaluation unit is further configured to evaluate training accuracy of the neural network or the classifier in each of the plurality of recognition tasks.

3. The apparatus according to claim 2, wherein the evaluation unit is further configured to evaluate an amount of displacement in the training accuracy of the neural network or the classifier in each of the plurality of recognition tasks at a predetermined interval.

4. The apparatus according to claim 1, wherein the training parameter includes a degree of significance to each of the plurality of recognition tasks in training the neural network or the classifier.

5. The apparatus according to claim 1, wherein the task setting unit is configured to set, as the plurality of recognition tasks, a first recognition task for which the neural network or the classifier is trained and a second recognition task generated from the first recognition task.

6. The apparatus according to claim 5, wherein the instructions further cause the processor to function as a teaching value setting unit configured to set a teaching value for the second recognition task, based on training data and a teaching value for the first recognition task.

7. The apparatus according to claim 1, wherein the evaluation unit is configured to evaluate the training result of the neural network or the classifier by using the training data for the plurality of recognition tasks.

8. The apparatus according to claim 1, wherein the evaluation unit is configured to evaluate the training result of the neural network or the classifier by using evaluation data different from the training data for the plurality of recognition tasks.

9. The apparatus according to claim 1, wherein the plurality of recognition tasks set by the task setting unit includes a classification task for identifying whether an object is included in an image.

10. The apparatus according to claim 1, wherein the plurality of recognition tasks include a detection task for detecting a position of an object.

11. The apparatus according to claim 1, wherein the plurality of recognition tasks include a segmentation task for extracting an object region.

12. The apparatus according to claim 1, wherein the parameter setting unit is further configured to select one of the plurality of recognition tasks for which the neural network or the classifier is trained, and set the training parameter based on training accuracy for the selected recognition task.

13. The apparatus according to claim 1, wherein the instructions further cause the processor to function as a task display unit configured to display the plurality of recognition tasks.

14. The apparatus according to claim 1, wherein the instructions further cause the processor to function as a result display unit configured to display the evaluated training result.

15. An information processing apparatus comprising:
a processor; and
a memory coupled to the processor storing instructions that, when executed by the processor, cause the processor to function as:
a storage unit configured to store information about a structure and a training parameter of a neural network or a classifier trained by the apparatus according to claim 1;
an input unit configured to input an identification target image into the neural network or the classifier based on the stored information; and
an output unit configured to output an identification result of the identification target image by the neural network or the classifier.

16. A method comprising:
setting a plurality of recognition tasks for which a neural network or a classifier is trained, wherein the plurality of recognition tasks is to recognize targets different from each other;
training the neural network or the classifier for the plurality of recognition tasks based on training data and a teaching value for the plurality of recognition tasks;
evaluating a training result of the neural network or of the classifier;
setting a training parameter including weight assigned to errors in the plurality of recognition tasks in training the neural network or the classifier for the plurality of recognition tasks, based on a result of the evaluating; and
performing second training on the neural network or the classifier according to the training parameter set by the setting based on the result of evaluation of first training by the evaluating.

17. A non-transitory computer-readable storage medium storing a program for causing a computer to perform:
setting a plurality of recognition tasks for which a neural network or a classifier is trained, wherein the plurality of recognition tasks is to recognize targets different from each other;
training the neural network or the classifier for the plurality of recognition tasks based on training data and a teaching value for the plurality of recognition tasks;
evaluating a training result of the neural network or of the classifier; and
setting a training parameter including weight assigned to errors in the plurality of recognition tasks in training the neural network or the classifier for the plurality of recognition tasks, based on a result of the evaluating; and
performing second training on the neural network or the classifier according to the training parameter set by the setting based on the result of evaluation of first training by the evaluating.

18. The information processing apparatus according to claim 15, wherein the plurality of recognition tasks set by the task setting unit includes a classification task for identifying whether an object is included in an image.

19. The method according to claim 16, wherein the plurality of recognition tasks set by the task setting includes a classification task for identifying whether an object is included in an image.

20. The non-transitory computer-readable storage medium according to claim 17, wherein the plurality of recognition tasks set by the task setting includes a classification task for identifying whether an object is included in an image.

* * * * *